United States Patent [19]
Evans

[11] 3,836,964
[45] Sept. 17, 1974

[54] AUTOMATIC DATA PROCESSOR
[75] Inventor: Norol T. Evans, San Pedro, Calif.
[73] Assignee: Hughes Aircraft Company, Culver City, Calif.
[22] Filed: Oct. 18, 1967
[21] Appl. No.: 676,243

[52] U.S. Cl............................... 343/7 A, 343/5 DP
[51] Int. Cl............................................... G01s 9/02
[58] Field of Search.......................... 343/5 DP, 7 A

[56] References Cited
UNITED STATES PATENTS
3,312,969    4/1967    Halsted.............................. 343/5 DP
3,430,235    2/1969    Bender et al....................... 343/7 RS Primary Examiner—T. H. Tubbesing
Attorney, Agent, or Firm—W. H. MacAllister; Laurence V. Link, Jr.

[57] ABSTRACT

An automatic data processor which allows a completely automatic track-while-scan function to be performed with a pencil beam radar. Multi-level detection systems are employed to process quantized and verified signals which have been reduced from an analog signal to digital data words indicative of the weight thereof. The codes in the verifier are compared with other codes so that only predetermined known values shown on one of two input channels are gated for further processing. A video correlator is employed which implements a moving window detector in three dimensions to help organize the information for subsequent processing. When the data words in the same range bin on adjacent beams in azimuth and elevation meet a predetermined criteria, a target detection is declared. The detection information is then sent through a detection blanking system to a beamsplitter and buffer unit. The video correlator also keeps track of how many detections occur sequentially in both azimuth and elevation at the same range bin. If the number of detections exceed a preset value, the clutter reject bit will be set and the beamsplitter will reject this data as clutter. The beamsplitter makes use of the video data words on adjacent beams in both azimuth and elevation to calculate beamsplit coordinates, and thereby determines the target location within a fraction of a beamwidth. A detector criteria control unit performs two functions for reducing the sensitivity of the system in automatically selected portions of the three-dimensional surveillance volume. The criteria control unit maps all target reports and distinguishes them from clutter. It blanks signals to a utilization device when there is clutter present; it may also modify the quantizer to reduce its sensitivity without blanking in certain cells. The criteria control unit also may incorporate a target rate counter for reducing detection sensitivity in sectors with a high detection rate.

9 Claims, 28 Drawing Figures

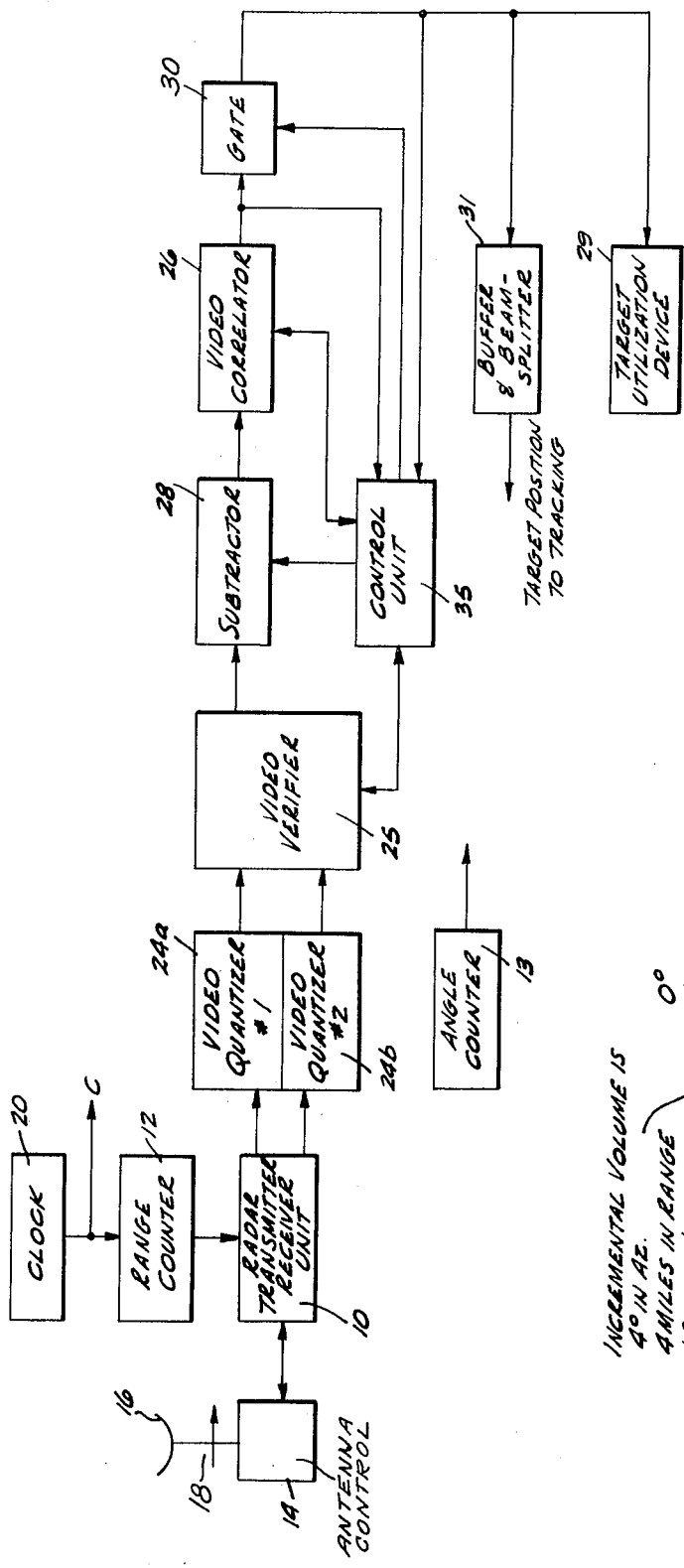
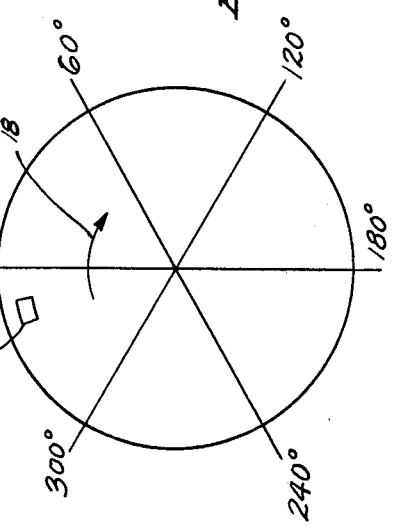

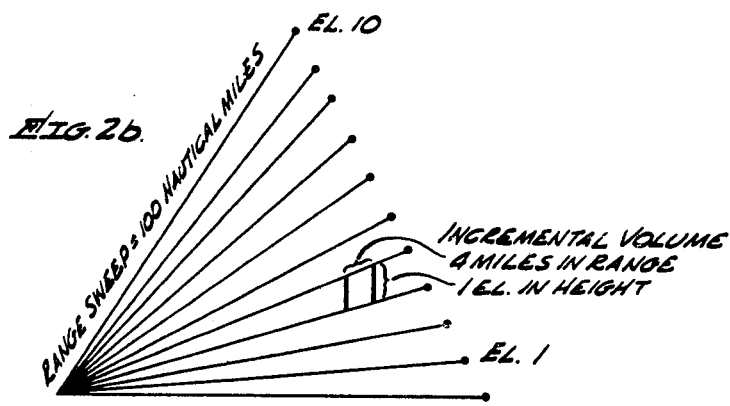
*FIG. 2b.*
| VIDEO AMPLITUDE CODE | RELATIVE AMPLITUDE OF PEAK VIDEO RETURNS WITH RESPECT TO RMS NOISE |
|---|---|
| 0 0 0 | $X < 3$ db |
| 0 0 1 | $3 \leq X < 6$ db |
| 0 1 0 | $6 \leq X < 9$ db |
| 0 1 1 | $9 \leq X < 12$ db |
| 1 0 0 | $12 \leq X < 18$ db |
| 1 0 1 | $18 \leq X < 27$ db |
| 1 1 0 | $27 \leq X < 39$ db |
| 1 1 1 | $39 \leq X$ |
*FIG. 3.*
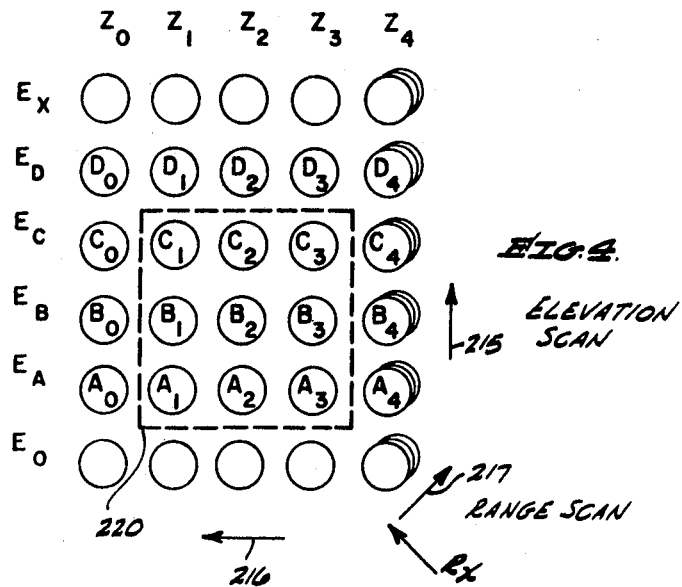
*FIG. 4.*

| DETECTOR | DETECTOR ABOVE RMS NOISE | DETECTOR SKIM LEVEL |
|---|---|---|
| D1 | 3 db | $V_1$ = SYSTEM SKIM LEVEL |
| D2 | 6 db | $V_1 + 3A$ |
| D3 | 9 db | $V_1 + 6A$ |
| D4 | 12 db | $V_1 + 9A$ |
| D5 | 18 db | $V_1 + 15A$ |
| D6 | 27 db | $V_1 + 24A$ |
| D7 | 39 db | $V_1 + 36A$ |
FIG. 7.
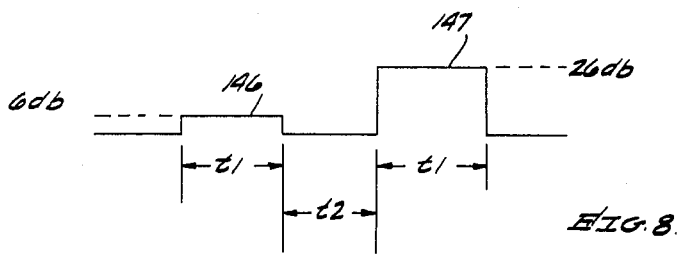
FIG. 8.
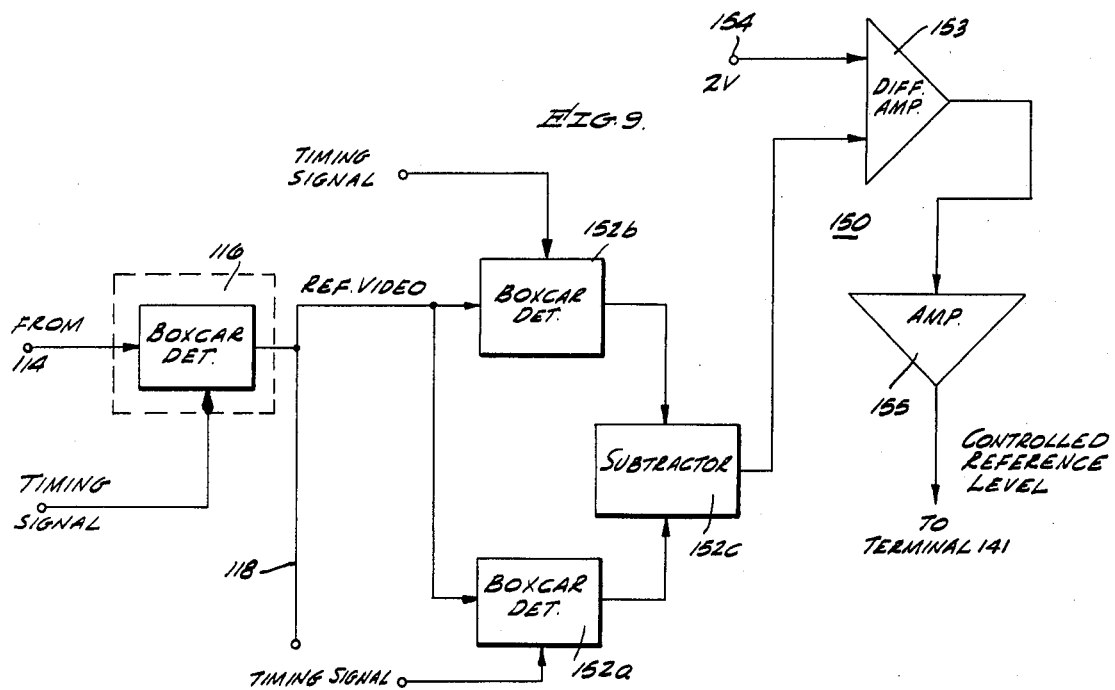
FIG. 9.

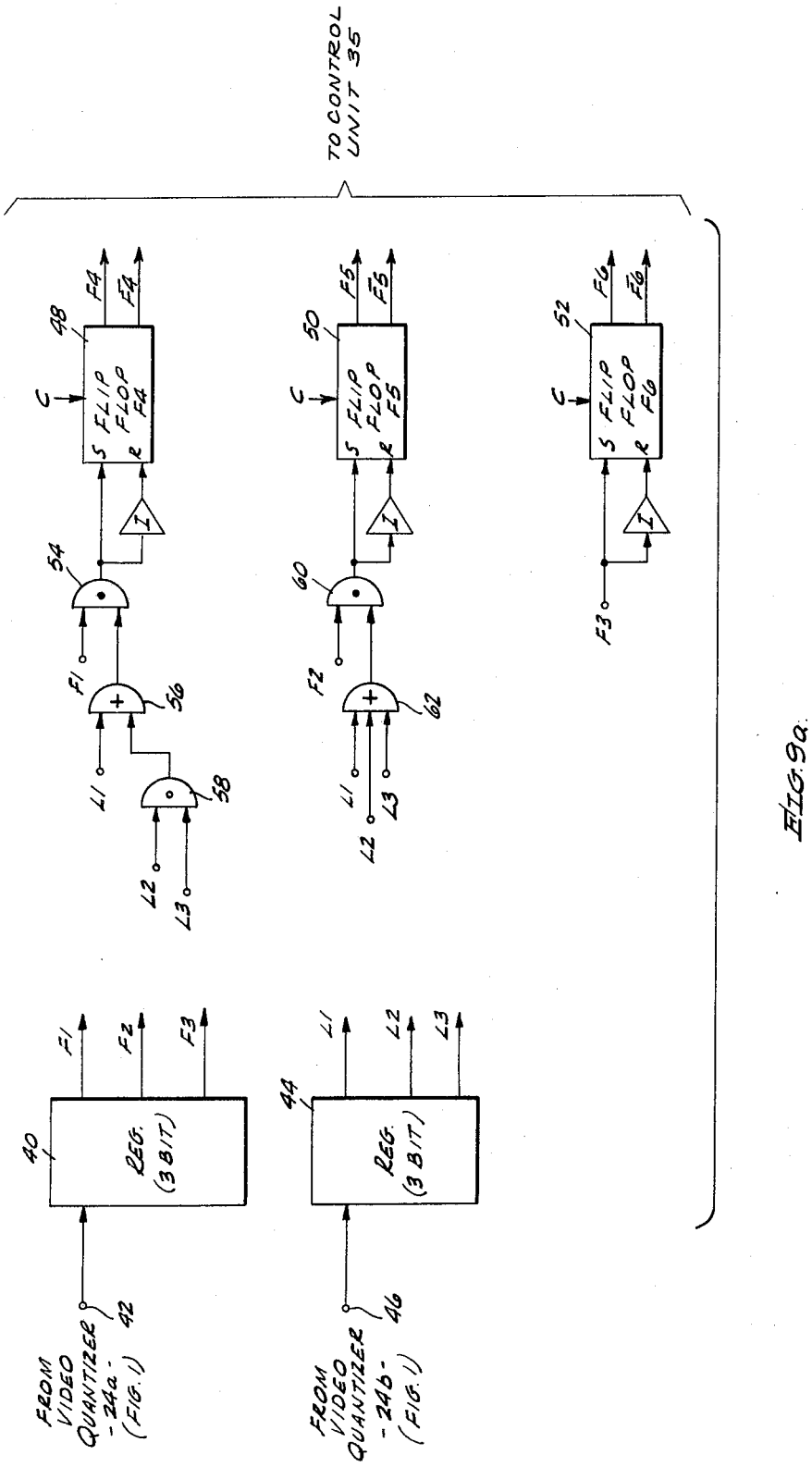

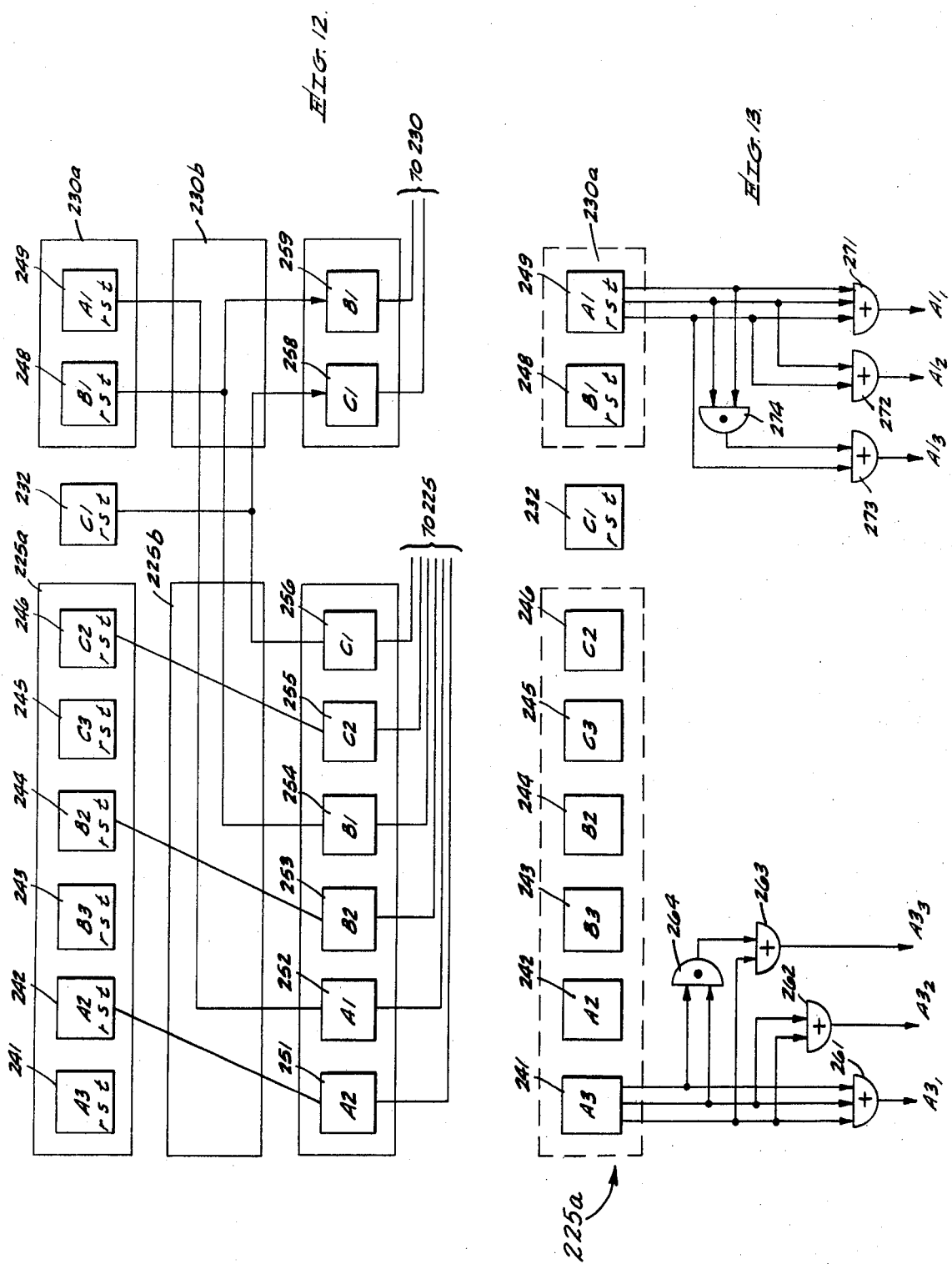

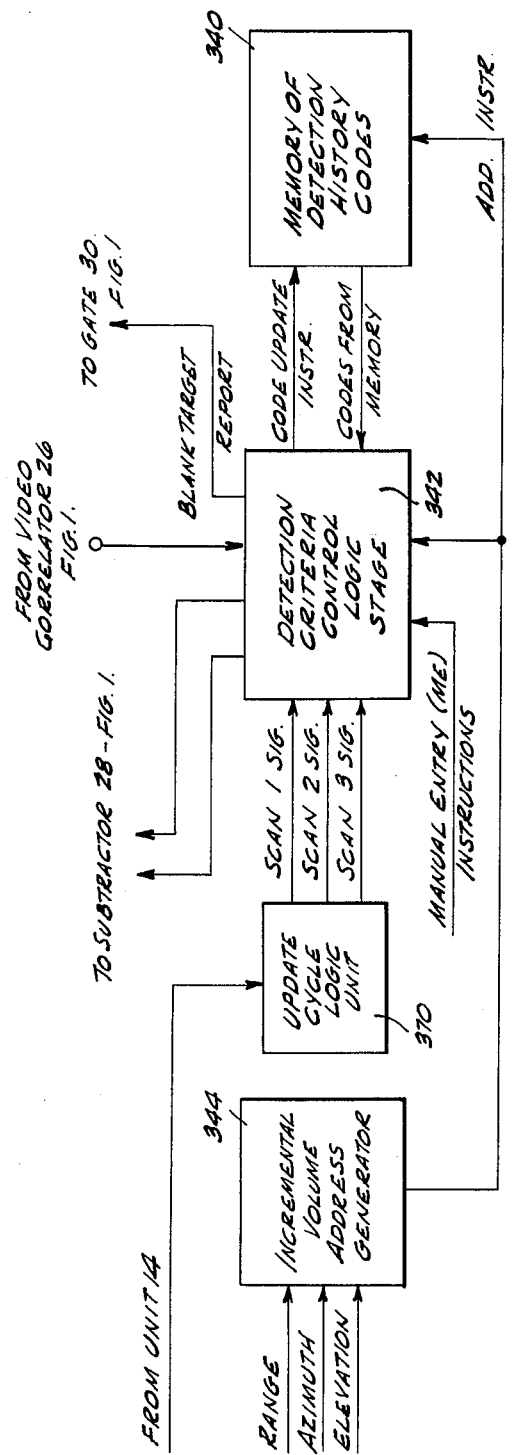

FIG. 18

| CODE MODIFICATION DURING SCAN #2 OF UPDATE CYCLE | | | |
|---|---|---|---|
| READOUT CODES | LOGIC PERFORMED | WRITE IN CODES | |
| | | NO DET. | DETECTION |
| 0 0 0 0 0 | NO ACTION | 0 0 0 0 0 | 0 1 0 0 0 |
| 0 0 0 1 0 | SUBTR. 1 | 0 0 0 0 1 | 0 1 0 0 1 |
| 0 0 0 1 1 | SUBTR. 1 | 0 0 0 1 0 | 0 1 0 1 0 |
| 0 0 1 0 0 | SUBTR. 2 | 0 0 0 1 0 | 0 1 1 0 0 |
| 0 0 1 0 1 | SUBTR. 2 | 0 0 0 1 1 | 0 1 1 0 1 |
| 0 0 1 1 0 | BLANK TARGET REPORTS | 0 0 1 1 0 | 0 1 1 1 0 |
| 0 0 1 1 1 | BLANK TARGET REPORTS | 0 0 1 1 1 | 0 1 1 1 1 |
| 0 0 0 0 1 | NO ACTION | 0 0 0 0 1 | 0 1 0 0 1 |

FIG. 19

| CODE MODIFICATION DURING SCAN #3 OF UPDATE CYCLE | | | | |
|---|---|---|---|---|
| ROW | INTERPRET READOUT CODE | | READOUT CODES | WRITE IN CODES |
| | CODE NO. AT START OF CYCLE | DETECTION DURING CYCLE | | |
| 1 | 1 | NO DETECTION | 0 0 0 0 0 | 0 0 0 0 0 |
| 2 | 1 | DETECT ON SCAN #2 | 0 1 0 0 0 | 0 0 0 0 1 |
| 3 | 2 | NO DETECTION | 0 0 0 1 0 | 0 0 0 0 0 |
| 4 | 2 | DETECT SCAN 1 | 0 0 0 1 1 | 0 0 0 1 0 |
| 5 | 2 | DETECT SCAN 2 | 0 1 0 1 0 | 0 0 1 0 0 |
| 6 | 2 | " SCAN 1 & 2 | 0 1 0 1 1 | 0 0 1 0 0 |
| 7 | 3 | NO DETECTION | 0 0 1 0 0 | 0 0 0 1 0 |
| 8 | 3 | DETECT SCAN 1 | 0 0 1 0 1 | 0 0 1 0 0 |
| 9 | 3 | " " 2 | 0 1 1 0 0 | 0 0 0 1 0 |
| 10 | 3 | " SCAN 1 & 2 | 0 1 1 0 1 | 0 0 1 1 0 |
| 11 | 4 | NO DETECTION | 0 0 1 1 0 | 0 0 1 0 0 |
| 12 | 4 | DETECT SCAN 1 | 0 0 1 1 1 | 0 0 1 1 0 |
| 13 | 4 | " " 2 | 0 1 1 1 0 | 0 0 1 1 0 |
| 14 | 4 | " SCAN 1 & 2 | 0 1 1 1 1 | 0 0 1 1 0 |
| 15 | 5 | NO DETECTION | 0 0 0 0 1 | 0 0 0 0 0 |
| 16 | 5 | DETECT SCAN 2 | 0 1 0 0 1 | 0 0 0 1 0 |

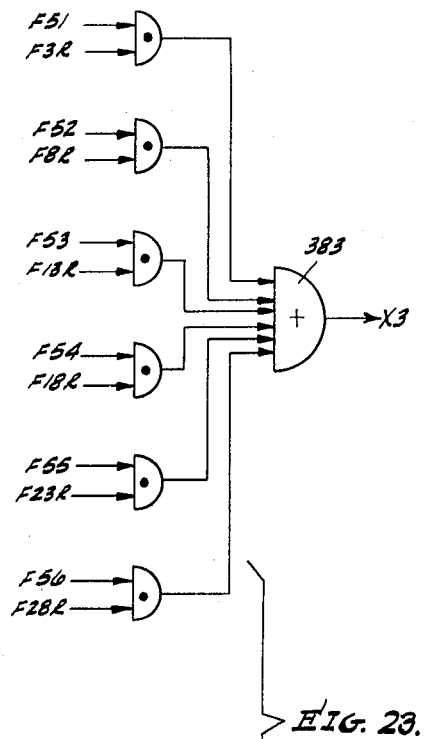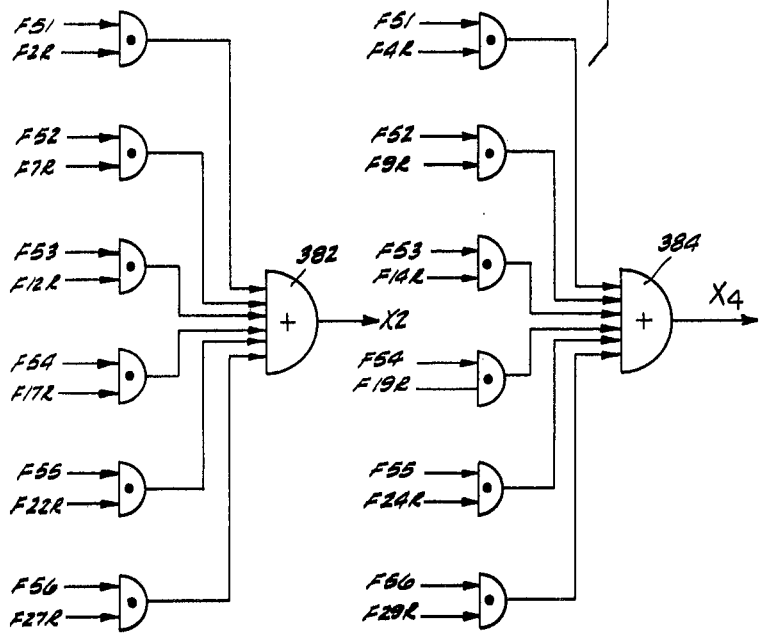
FIG. 23.

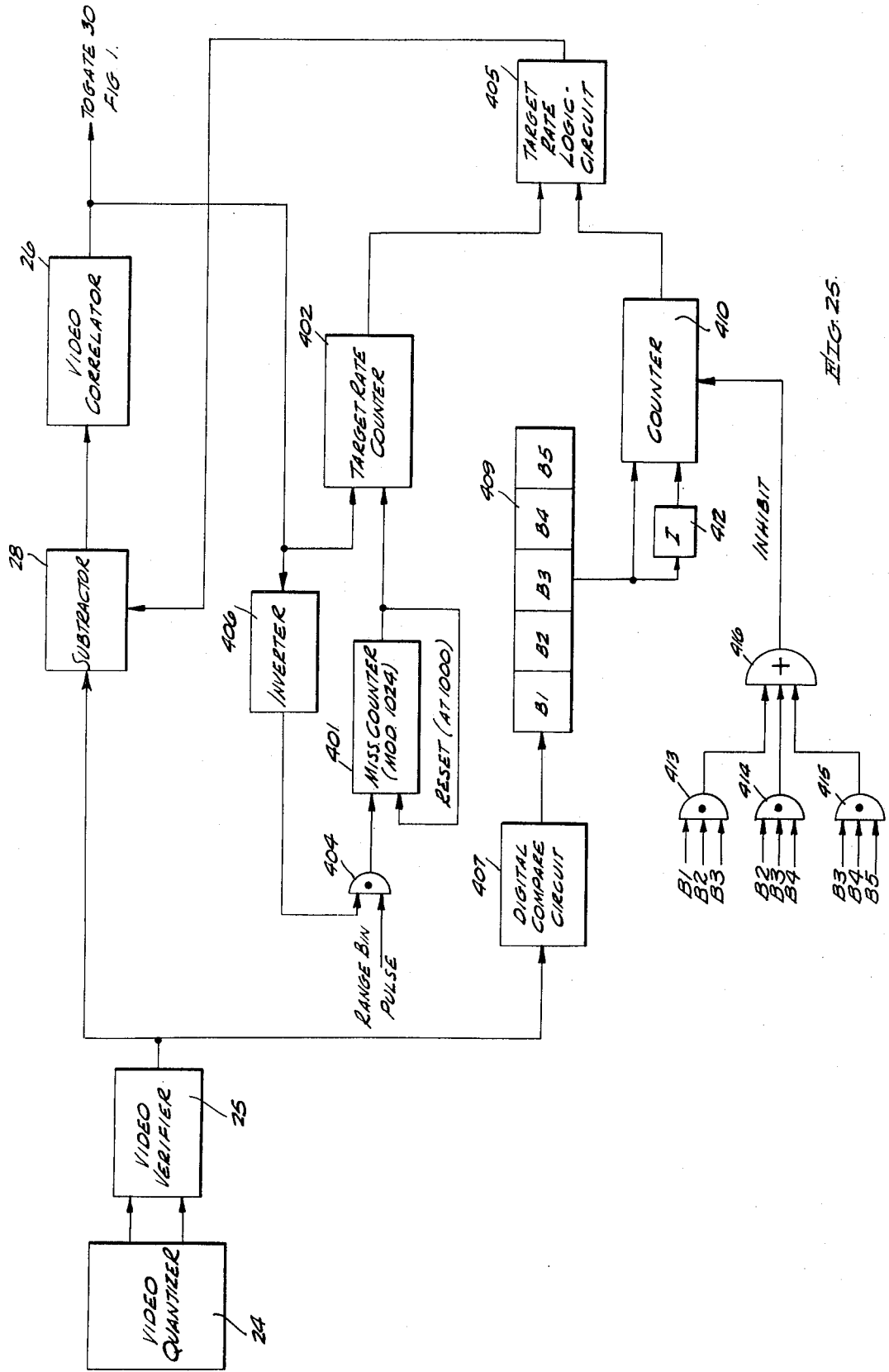

AUTOMATIC DATA PROCESSOR

CROSS-REFERENCES TO RELATED APPLICATIONS

Some of the subject matter disclosed herein is related to U.S. Pat. applications Ser. No. 631,307, filed Apr. 17, 1967 and Ser. No. 665,383, filed Sept. 5, 1967 and U.S. Pats. 3,392,386 and 3,412,397, all of which are assigned to the Assignee of the subject application.

BACKGROUND OF THE INVENTION

This invention relates to a data processor useful in radar receiving systems, and more particularly to an automatic detection device for reducing the false alarm rate in track-while-scan radar systems.

A major problem in automatic detection and acquisition digital track-while-scan radar systems is the automatic processing of all the video returns from the surveillance radar which is necessary to separate meaningful targets, which are to be tracked, from other targets in the form of clutter, external interference, and ambient noise to an acceptable rate, without exceeding the system's target storage capacity. At present, nearly every radar system of any degree of complexity employs a computer to process the video returns, which are generally digitized or quantized before being supplied to the computer. The computer memory is also used to store detected targets which are to be followed or tracked.

Any tracking computers are limited by the maximum number of targets and tracks they can handle. Such limitation is related to the size of the computer memory and to its speed of operation. If the number of targets or tracks which the computer must handle exceeds its handling capacity, the whole processing system malfunctions to the extent that all the stored data may become essentially useless. Since much of the stored information represents false targets, it can be stated that the price paid for including false target reports is low, as long as the system's maximum storage capacity is not approached. However, once such capacity is approached the cost increases, becoming infinitely high when the capacity is exceeded. Since most false target reports are due to clutter and localized external interference, a basic requirement in advanced radar systems is to automatically reduce the number of false target reports produced by such sources.

Some prior art devices incorporate a system for sequential detection processing which requires that a second beam be transmitted when the detection threshold is exceeded on the first transmission. One disadvantage of the aforesaid sequential detector is that the target position report accuracy is not adequate for automatic tracking. The system of the present invention increases the azimuth and elevation accuracy by at least 8 to 1, for example, over these prior art detectors. Also, the sequential detecting technique is inefficient, for example, the sequential technique is 3 to 4db poorer at a probability of detection (P.D.) of 90 percent than the system of the present invention. The reason for this is that the sequential detector usually makes no use of the signal returned in adjacent beams. However, for large targets (greater than 30db) additional target reports will be generated on adjacent beams which increases the false alarm rate significantly. If realistic pulse interference conditions are assumed, the sequential detector will dissipate 3db in radar power because it will have to verify every beam position.

Clutter rejection techniques using azimuth and/or elevation excursions cannot be implemented with the sequential detector but are implemented by the system of this invention.

SUMMARY OF THE INVENTION

Briefly described, the present invention provides an automatic detection system useful in pencil beam track-while-scan radar, for example, which reduces the false alarm rate due to clutter, external interference and ambient noises to an acceptable rate. Furthermore, it automatically adapts to its environment so that the detection sensitivity is maximized in any type of environment such as the aforesaid interference, clutter, etc. The present invention includes video quantizers in the form of multi-level digital skimmers which provide inputs to a data processor means. One unit of the video quantizer quantizes the logarithmetic fast time constant (FTC) video into several levels while the other video quantizer quantizes the video from a wideband limited receiver. Each quantizer provides a specified digital code according to the level of the signal-to-noise ratio and both quantize the video in each selected range bin simultaneously (the range bin being approximately equal to the radar pulse width). On each range sweep the video is quantized at each range bin into a 3-bit parallel digital data word. The false alarm rate control of the first three skim levels is held to one sigma accuracy of 0.1 db, for example. The high accuracy is required because an increase in the false alarm rate of these skimmers is multiplied by a very large ratio in a video correlator, if the correlator is to be an efficient automatic detector. These 3-bit parallel words are then applied to an automatic video verifier unit. The video verifier includes a counting means on each digital video input from the video quantizers to verify the pulse and for distinguishing clutter from actual target detection. Clutter is detected as a function of the relative signal level and the number of returns in adjacent resolution cells. Pulse interference is designated whenever a counter associated with a particular resolution cell reaches a higher predetermined count.

The logarithmetic FTC video is range correlated with the limited type of video so that the log FTC video is not gated for further processing unless the limited type video bears a preselected relationship to the logarithmetic FTC video. The output codes are then sent through a sensitivity modifier to a video correlator.

The correlator implements a moving window detector in three dimensions and helps organize this information for subsequent beamsplitting. The minimum detection required for this system consists of one of three patterns in their spatial orientation. Each time the video codes at the range bin at adjacent beams in azimuth and elevation meet the above criterion an automatic detection is declared. The detection information is then sent through the detection blanking gate to the beamsplitter and buffer. The video correlator also keeps track of how many detections occur sequentially in both azimuth and elevation at the same range bin. If the number of detections exceeds a preset value, the clutter reject bit will be set and the buffer and beamsplitter unit will reject this data as clutter. The beamsplitter makes use of the video amplitude codes on the adjacent beams in both azimuth and elevation to calculate the beamsplit coordinates. When the stack factor (which is defined as the reciprocal of the number of beamwidths separation between adjacent beams) in each direction is a predetermined value, such as 1.414, for example, a beamsplitting accuracy of at least ⅛ beamwidth is achieved over the entire dynamic range. Range and angle counters provide the real time data of range, azimuth and elevation to all of the units of the system which requires its use. The detection control unit maximizes the detection sensor sensitivity of the overall system while placing an absolute maximum on false alarm rate due to interference and clutter. The detection criteria control unit performs two functions that reduce the detection sensitivity of the system in automatically selected portions of the three-dimensional surveillance volume. One function records detections of each small incremental volume of the surveillance volume. It periodically observes if detections persist in each incremental volume. When detection persists, clutter is assumed at this location and the system's sensitivity is reduced 3db in this volume. If this should not solve the problem, a 6db sensitivity reduction is tried. If the 6db reduction doesn't solve the problem, the detections from the incremental volume are blanked. If the clutter later moves out of the volume the detection sensitivity is automatically restored. The second function of the control unit is to determine the detection rate at the video correlator output. A counter within the control unit counts up at a preselected amount for each hit detection and counts down a lesser amount for each miss. Logic means is provided to reduce the sensitivity over an azimuth sector in conjunction with the input counter. System sensitivity is reduced by subtracting predetermined increments either one or two, for example, from the video codes before entering them into the video correlator or by providing additional detection gates therein. The signal output from the blanking gate may also be used to display real time detection.

It therefore becomes one object of this invention to provide a novel and improved automatic data processor.

Another object of this invention is to provide a novel and improved automatic data processor useful with a pencil beam track-while-scan radar system.

Another object of this invention is to provide a novel and improved automatic data processor with a detection sensitivity that is automatically maximized in any type of environment.

DESCRIPTION OF THE DRAWINGS

These and other objects features and advantages will become more apparent when taken into consideration with the following detailed description where like reference numerals indicate like or corresponding parts throughout the several views and wherein;

FIG. 1 is a block diagram of one preferred embodiment of the system of this invention;

FIGS. 2a and 2b are graphical diagrams useful in explaining the antenna scan positions assumed for explanation of the system of this invention;

FIG. 3 is a table illustrating relative peak amplitude returns with respect to RMS noise;

FIG. 4 is a diagram, useful in explaining the moving window detector system employed in the system of this invention;

FIGS. 7 and 8 are a table and a graph illustrating various signal levels and waveforms, respectively.

FIG. 9 is a block diagram of additional circuitry incorporated in the video quantizers of the system of this invention.

FIG. 9a is a detailed schematic logic diagram of the video verifier shown in FIG. 1;

FIG. 10A is a chart of different types of acceptable hit patterns;

FIG. 10B is a chart useful in explaining the hit pattern correlation of the beamsplitting techniques;

FIG. 12 is a detailed lock diagram of a portion of the circuitry shown in FIG. 11;

FIGS. 13 and 14 are detailed logic diagrams of the system shown in FIG. 11;

FIG. 15 is a block diagram illustrating in more detail the control unit of FIG. 1;

FIGS. 16, 17, 18 and 19 are charts useful in explaining the operation of the control unit shown in FIG. 15;

FIG. 23 and 24 are logic diagrams of logic circuitry included in the control logic stage shown in FIG. 15;

FIG. 25 is a block diagram of a second embodiment of the control unit shown in FIG. 15.

DETAILED DESCRIPTION OF PREFERRED EMBODIMENTS

Figure 5:
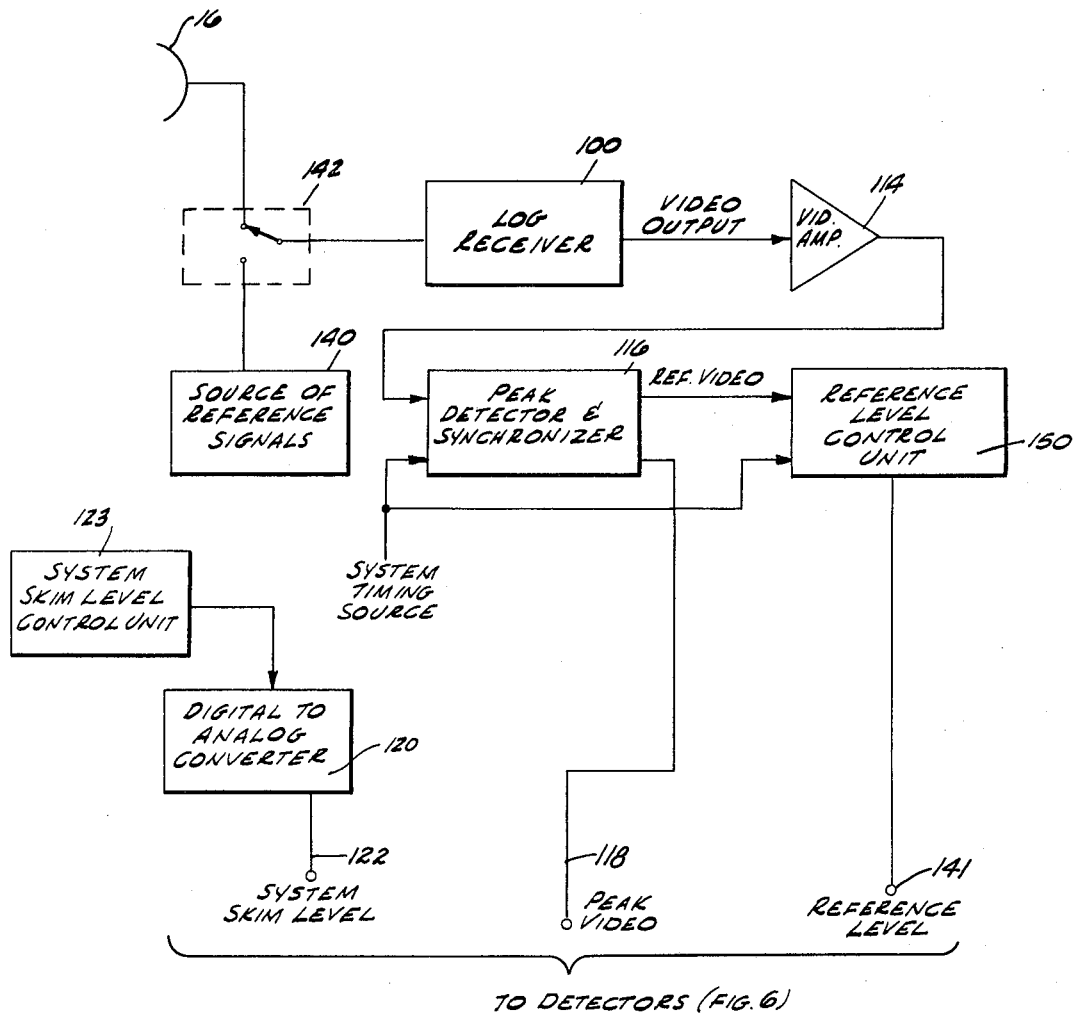
FIG. 5 is a block diagram illustrating a skim level detector used in the video quantizers shown in FIG. 1.

Turning now to a more detailed description of this invention, there is shown in FIG. 1 a general block diagram of the automatic data processor of this invention used with a radar system. A radar transmitter-receiver (T-R) system 10 which, in synchronism with a master trigger signal derived from a range counter 12, applies pulses of energy to an antenna control system 14 which includes a rotating surveillance antenna 16. In the following description, it is assumed that the antenna rotates in a horizontal plane in a clockwise direction, as indicated by arrow 18 in FIG. 1. Each complete revolution represents a complete radar scan. At each of a plurality of azimuth positions, only six of which are shown in FIG. 2a, pulses of energy are sequentially transmitted into space from antenna 16 at a plurality of elevations. These pulses and the directions in which they are transmitted and from which reflected signals are received are hereinafter referred to as range sweeps.

For explanatory purposes, it is assumed that only 10 range sweeps designated EL1 through EL10 in FIG. 2b are transmitted at each azimuth position. The spacing between adjacent azimuth positions is assumed to equal a selected angular spacing, such as 1° for example. In such a scanning arrangement, during a complete radar scan, pulses or range sweeps are transmitted at 10 elevations in each of 360 azimuth positions.

Range counter 12 (FIG. 1) is assumed to define a plurality of range bins or intervals in space along each range sweep from which reflected energy may be received by the antenna 16. If it is assumed that each range sweep contain 400 range bins of 3.09 microseconds (μs) each and that the transmitted energy pulse width is approximately of the same length; since each range bin corresponds to 500 yards range, the length of each range sweep is 100 nautical miles. Pulses necessary to control range counter 12, as well as various logic circuits, such as gates and flip flops to be described hereafter in detail, may be provided by a clock 20. The output pulses of clock 20 hereafter referred to as clock pulses are designated by the term C.

The energy reflected to antenna 16 from radar targets which may include meaningful targets, such as aircraft, and undesired targets such as clutter, is supplied to system 10. Therein video returns from each range bin are developed at video frequency by mixing and envelope detecting techniques, which are well known in the art. The output of system 10 during each system time period thus represents the video returns from a different range bin.

As is appreciated by those familiar with the art, in advanced track-while-scan radar systems, such video returns are generally first quantized before they are processed or correlated to determine whether they represent meaningful targets to be tracked. In FIG. 1, the video returns from system 10 are shown supplied to video quantizers 24a and 24b. The video quantizers may include multi-level skimmers to distinguish signal from noise. The outputs of quantizers 24a and 24b are applied to a video verifier 25 and then to a video correlator 26 through a subtractor 28. It is the output of the correlator 26 that represents detected targets or target reports which are generally supplied to a utilization device 29. Such a device may comprise a target display device and/or a target storing memory, used for target tracking. In FIG. 1, the target reports from correlator 26 are shown supplied to device 29 through a gate 30.

Video quantizers 24a and 24b are assumed to digitize the video returns received from system 10 into 3-bit video codes. The numerical value of each 3-bit binary code is made indicative of the number of decibels (db's) by which the peak of the video returns from each range bin exceeds a preselected threshold level. The threshold level may be a function of the systems RMS noise. The explanation of the video quantizer will be explained in more detail with reference to FIGS. 3–7, wherein two multi-level skimmers are shown for providing two digitally coded video signals to video verifier 25. The actual numerical values of the 3-bit codes with respect to the number of db's by which the peak video returns exceed RMS noise are diagrammed in chart form, by way of example, as follows and shown in FIG. 3:

| Coded Video | Relative Amplitude of Peak Video Returns (X) with Respect to RMS Noise | | |
|---|---|---|---|
| 000 | | X < | 3db |
| 001 | 3 ≤ | X < | 6db |
| 010 | 6 ≤ | X < | 9db |
| 011 | 9 ≤ | X < | 12db |
| 100 | 12 ≤ | X < | 18db |
| 101 | 18 ≤ | X < | 27db |
| 110 | 27 ≤ | X < | 39db |
| 111 | 39 ≤ | X | |

TABLE I

The other video quantizer unit 24b quantizes the video from a wideband limited receiver which effectively reduces the effects of strong off-frequency interference that is intense enough for the spectral sidebands of the interference to impair normal detection, similar to the type described on page 558 in FIG. 12.20 of "Introduction to Radar Systems" by M. I. Skolnik, McGraw-Hill, 1962. The second unit quantizes the video at the following levels.

| Digital Code | Relative Amplitude of Peak Video Returns ⅛X¼ with Respect to RMS Noise |
|---|---|
| 000 | X < 3db |
| 001 | 3db ≤ X < 6db |
| 010 | 6db ≤ X < 9db |
| 011 | 9db ≤ X < 12db |
| 100 | 12db ≤ X < 18db |
| 101 | 18db ≤ X |

TABLE II

As seen in Table I, the coded video or output of quantizer 24a is zero (000) when the peak of the video returns from a range bin or interval is less than 3db's above RMS noise. On the other hand, when the peak video returns from a range bin equals or exceeds RMS noise by 39 db's, the 3-bit binary code is seven (111), as seen from the last line of Table 1. Such a number may be thought of as being a code 7 hit. The other 3-bit numbers in the left column of Table I represent a code 0 hit, code 1 hit, code 2 hit, etc.

Both quantizers 24a and 24b quantize the video in each range bin (the range bin is approximately equal to the radar pulse width) on every range sweep into a 3-bit parallel word. The false alarm rate control of the first three skim levels is held to a one sigma accuracy of 0.1 db. The high accuracy is required because an increase in the false alarm rate of these skimmers is multiplied by a very large ratio in video correlator 26 if it is to be an efficient automatic detector. These two 3-bit parallel words are then applied to automatic video verifier unit 25, which will be explained later. The purpose of verifier unit 25 is to compare the binary weight of the output from the quantizer 24a with the weight of the output of the quantizer 24b, and if they are not within a predetermined value, a signal is applied to control unit 35a to indicate that the signal in a particular clock time (range bin) is not a valid target. Control unit 35a then in turn will automatically apply the proper signal to gate 30 if control unit 35 cannot modify the signal by appropriate bit subtraction in subtractor 28. The operation of control unit 35 will be explained in more detail as this description of a preferred embodiment proceeds.

In operation, an automatic detection system useful in pencil beam track-while-scan radar, for example, reduces the false alarm rate due to clutter, external interference and ambient noises to an acceptable rate. Furthermore, it automatically adapts to its environment so that the detection sensitivity is maximized in any type of environment such as the aforesaid interference, clutter, etc. The present invention includes a video quantizer 24a and 24b in the form of multi-level digital skimmers, which will be described in more detail, which provides inputs to a data processor means. One unit of the video quantizer 4a quantizes the logarithmic fast time constant (FTC) video in several levels while the other video quantizer 24b quantizes the video from a wideband limited receiver and each quantizer 24a and 24b provides a specified digital code according to the level of the signal-to-noise ratio and quantizes the video in each selected range bin (the range bin being approximately equal to the radar pulse width). On each range sweep as heretofore defined, the video is quantized into a 3-bit parallel word. These 3-bit parallel words are applied to an automatic video verifier unit 25, which includes an up/down counting means on each digital video input. Unit 25 identifies pulse jamming and distinguishes clutter from actual target signals. Clutter is detected by the number of relatively high amplitude signals on adjacent range bins as determined by the count of associated counters. Video verifier unit 25 will be explained in more detail later as this description proceeds. Pulse jamming is designated whenever each counter in the verifier 25 reaches a higher predetermined count. The logarithmic FTC video is range correlated with the limited type of video so that the log FTC amplitude must at least be some preselected percentage of the value on the other channel in order to be gated for further processing. The output codes are then sent through a sensitivity modifier in the form of a subtractor 28, to video correlator 26. Correlator 26 implements a moving window detector in three dimensions and helps organize this information for subsequent beamsplitting in beamsplitter 31. The minimum detection required for the illustrated system consists of one of three patterns in their spatial orientation. As will be discussed in greater detail subsequently, each time the video codes at the range bin of adjacent beams in azimuth and elevation meet the preselected criterion, an automatic detection is declared. The detection information is then sent through a detection blanking gate 30 to beamsplitter and buffer 31. Video correlator 26 also keeps track of how many detections occur sequentially in both azimuth and elevation at the same range bin. If the number of detections exceeds a preset value, a clutter reject bit will be set and beamsplitter 31 will reject this data as clutter. Beamsplitter 31 makes use of the video amplitude codes on the adjacent beams in both azimuth and elevation to calculate the beamsplit coordinates. When the stack factor (which is defined as the reciprocal of the number of beamwidths separation between adjacent beams) in each direction is a predetermined value such as 1.414, for example, a beamsplitting accuracy of at least ⅛ beamwidth is achieved over the entire dynamic range. Range counter 12 and angle counter 13 are provided and provide the real time information of range, azimuth and elevation to all of the units of the system of this invention which require its use. A detection control unit 35 maximizes the detection sensor sensitivity of the overall system while placing an absolute maximum on false alarm rate due to interference and clutter. Control unit 35 performs two functions which reduce the detective sensitivity of the system in automatically selected portions of the three-dimensional surveillance volume. One function of unit 35 is to detections in each small incremental volume of the surveillance volume and to periodically observe if detections persist in each incremental volume. When detection persists, clutter is assumed at this location and the system's sensitivity is reduced 3db in this volume. If this should not solve the problem, a 6db sensitivity reduction is tried. If the 6db reduction doesn't solve the problem, the detections from the incremental volume are blanked by gate 30 until the clutter moves out of the volume after which time the detection sensitivity is automatically restored. The second function of control unit 35 is to determine the detection rate of the output of video correlator 26. An up/down counter therein is used which counts up at a preselected amount for each detection and counts down a lesser amount for each miss. Logic means is provided to reduce the sensitivity over an azimuth sector in conjunction with the input jamming counter. The system sensitivity is reduced by subtracting a predetermined increment either one or two, for example, from the video codes before entering them into video correlator 26 by providing an additional detection gate therein. The signal output from blanking gate 30 may also be used to display real time detection in target utilization device 29.

MULTILEVEL SKIMMERS

Figure 6:
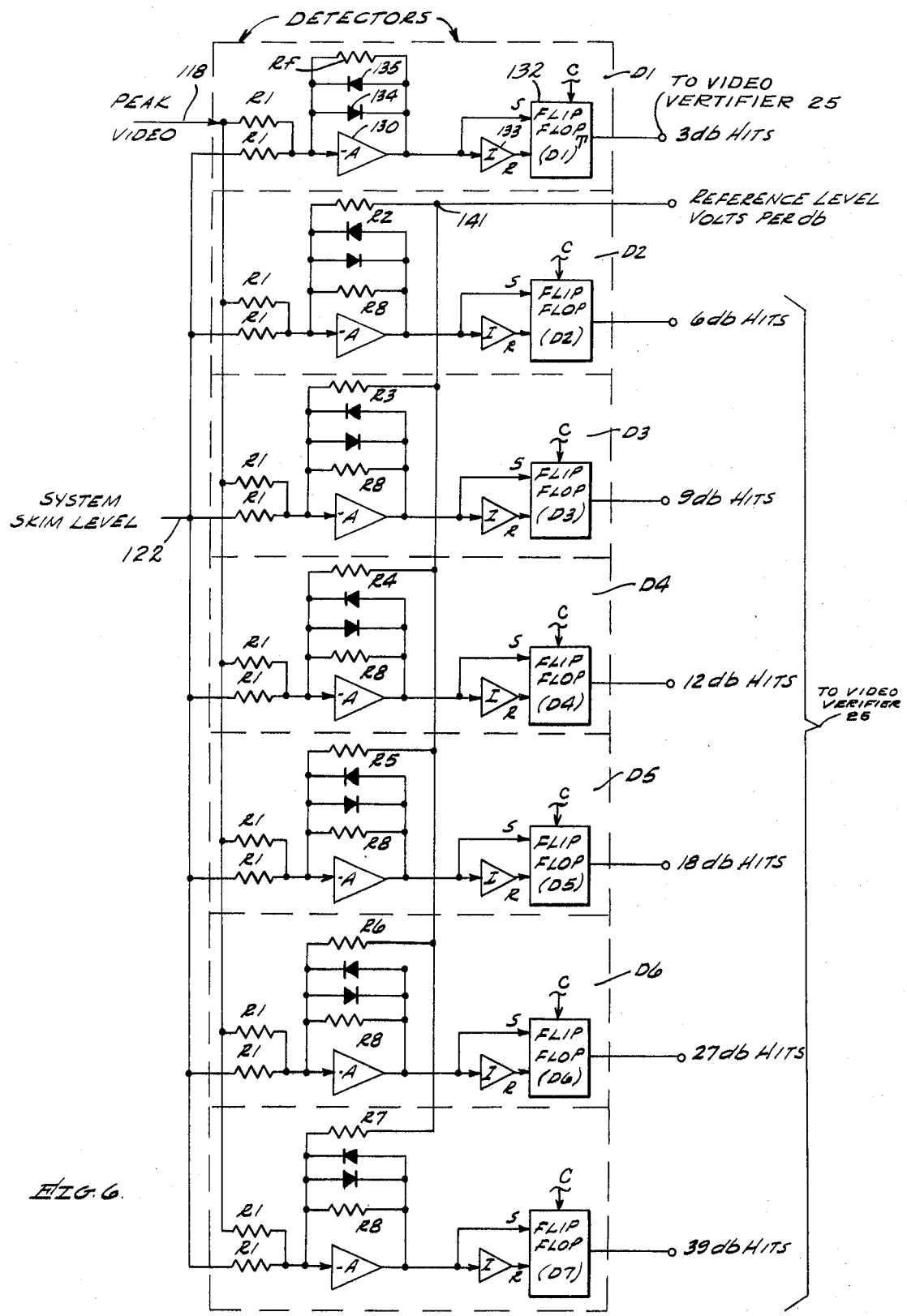
FIG. 6 is a more detailed description of the system's skim level detectors.

One mechanization of a digitizing circuit suitable for quantizers 24a and 24b is shown in FIGS. 5 and 6. FIG. 5 is a block diagram of the input circuitry for an array of detectors, schematically shown in FIG. 6.

Briefly, the input of a log receiver 100 (FIG. 5) which may be part of transmitter receiver unit 10 is selectively switched to antenna 16 to receive radio frequency signals therefrom. Receiver 100 includes conventional radio frequency, mixing and detecting circuits for providing radar signals at video frequency as is well known in the art. Such signals may also be referred to as the receiver's video output signals. The video output of log receiver 100 is amplified by a video amplifier 114, which is connected to a peak detector and synchronizer circuit 116. Circuit 116 is also supplied with timing signals from the system timing source 20 (not shown in FIG. 5). Basically, the function of circuit 116 is to determine the peak value of the video returns occurring during each system time period which may represent a single range bin and supply it, by means of output line 118, to the detectors, shown in FIG. 6. Such signals are referred to and designated PEAK VIDEO.

Peak detector 116 may comprise a boxcar detector which, in addition to the output video from amplifier 114, receives a timing signal during each system time period. As is appreciated by those familiar with the art of radar, such a detector is capable of providing an output representing the peak of the signal supplied to it during each time period. At the end of each time period the detector is reset to respond to the signals supplied during a subsequent time period. The output of peak detector 116, is also supplied to a reference level control unit 150 as reference video for purposes to be described hereafter in detail.

Hereafter for explanatory purposes, let it be assumed that under normal operating conditions, the video output signal of the amplifier 114 is proportional to the log of the input video signals from antenna 16 by the relationship of 0.1 volts/db. Let is also be assumed that the gain of detector 116 is 1, under normal operating conditions. Consequently, an increase of 1db in the signals received by log receiver 100 results in an increase of 0.1 volts in the output of detector 116. The RMS noise level is typically set at 1 volt. Hence, a signal 3db above RMS noise would be 1.3 volts and a signal 6db above the RMS noise level would be 1.6 volts.

As seen from FIG. 5, the circuitry further includes a digital to analog (D/A) converter 120, the function of which is to supply, by means of an output line 122, an analog system threshold or skim level to the detectors as a function of digital signals received from a system skim level control unit 123. The function of the latter-mentioned unit is to control the system's skim level to maintain a constant predetermined false alarm rate for 3db hits. That is, control the system's skim level, so that the rate at which video peak values of 3db above the system's RMS noise received during a selected interval does not exceed a selected rate. Such control units or circuits, adjustable to perform such functions are well known by those familiar with the art of radar. One example of a control device used to control a threshold level as function of target detection is shown and described in U.S. Pat. No. 3,214,754 entitled, "Radar System with Automatic Threshold Control."

Reference is now made to FIG. 6, wherein a plurality of detectors D1 through D7 are schematically diagrammed. For explanatory purposes only, the number of detectors has been limited to seven. Detector D1 is supplied with the PEAK VIDEO from peak detector 116 (FIG. 5) by means of line 118, and the system skim level through line 122. It compares the two levels and provides a true output whenever the PEAK VIDEO equals or exceeds the system's skim level.

Basically, the system skim level is controlled by the system skim level control unit 123 to be 3db above the system's RMS noise level. Thus, the output of detector D1 is true only when the PEAK VIDEO is 3db above the RMS noise of the radar system. Such a true output may be thought of as 3db hit. In one arrangement, the true outputs of D1 are counted to determine the rate of 3db hits. This in turn is used to adjust the system skim level so that a false alarm rate of 3db hits does not exceed a desired value.

Similarly, detectors D2 through D7 are supplied with the PEAK VIDEO and the system skim level. They provide true outputs when the PEAK VIDEO is 6, 9, 12, 18, 27 and 39db respectively, above the RMS noise. Each of the detectors D1 through D7 includes an operational amplifier 130, the input of which is connected to each of lines 118 and 122 through a separate resistor R1. The output of the amplifier is directly connected to the set (S) input of a D flip flop 132 and through an inverter 133, to the reset (R) input of D flip flop 132. The true (T) output of D flip flop 132 comprises the output of the detector. A resistor $R_f$ and two diodes 134 and 135 form the feedback loop for the operational amplifier 130.

The flip flops of the detectors D1 through D7 are clocked, that is, activated by clock 20 (FIG. 1) to respond to the signals at their R and S inputs, so that all the detectors simultaneously supply outputs indicating the relative amplitude of the PEAK VIDEO with respect to RMS noise. It should be appreciated that once one of the detectors provides a true output all preceding detectors have true outputs. For example, when the PEAK VIDEO is at least 18db above RMS noise, but less than 18db$^s$, the output of detector D4 is true. Also, the outputs of D2 and D3 are also true since their outputs are true when the PEAK VIDEO exceeds RMS noise by at least 6 and 9 db respectively.

The outputs of the detectors D2 through D7 may be supplied to video verifier circuit 25 (as previously discussed). One function of verifier 25 is to indicate the highest numbered detector having a true output, thereby indicating the range of the PEAK VIDEO above RMS noise.

In addition, the inputs of amplifier 130 of detectors D2 through D7 are connected through resistors R2 through R7, respectively, to an input terminal 141, through which an accurately controlled reference level is supplied to these detectors. The values of R1 through R7 are chosen, so that the outputs of the detectors are true only when the PEAK VIDEO exceeds the system's skim level by a fixed number of db. For example, in detector D2 the value of R2 is chosen with respect to R1 so that only when the PEAK VIDEO is 6db above the RMS noise, or 3db above the system skim level, is the output of D2 true. Similarly, in detector D3 the value of R3 is chosen so that only when the PEAK VIDEO is 9db above the RMS noise, that is, 6db above the skim level, is the output of D3 true.

The operation of each detector (D2 through D7) may be expressed mathematically by the following equation:

$$I_{sum} = (\text{PEAK VIDEO}/R1) - (\text{SYSTEM SKIM LEVEL}/R1) - (\text{REFERENCE LEVEL}/Rx) \geq 0. \quad (1)$$

where $x$ is 2, 3, etc., in detectors D2, D3, etc. The output of the detector is true when $I_{sum}$ is greater than zero (0). In the foregoing expression, by multiplying each term by R1, one gets that, $$E_{sum} = R1\, I_{sum} = \text{PEAK VIDEO} - \text{SYSTEM SKIM LEVEL} - R1/Rx\ \text{REFERENCE LEVEL} \geq 0. \quad (2)$$

By proper choice of the values of R2 through R7, with respect to R1 and the reference level, detectors D2 through D7 are controlled to provide true outputs only when the PEAK VIDEO is above the RMS noise level by a given number of db.

For explanatory purposes, let the system skim level which is, as herebefore assumed, 3db above the RMS noise be defined as $V_1$, and the output of the peak detector per db of video return as A. Then the output of D2 is true only when the PEAK VIDEO is $V_1 + 3A$, since D2 is designed to provide a true output when the PEAK VIDEO is 6db above RMS noise, or 3db above the system skim level.

The level $V_1 + 3A$ may be thought of as defining the skim level of detector D2. The skim level for the other detectors are listed in the Tables I and II previously discussed.

From the foregoing, expression (2) may be rewritten for detector D2 as:

$E_{sum} = V_1 + 3A - V_1 - (R1/R2)\ \text{REFERENCE LEVEL}$
$= 3A - (R1/R2)\ \text{REFERENCE LEVEL} \geq 0.$ It is thus seen that the accuracy of detector D2 to provide a true output when the PEAK VIDEO is 6db above RMS noise or 3db above the skim level depends on the accuracy of A or the volts per db through the log receiver 100, amplifier 114 and the peak detector 116 (FIG. 5). If A were constant under all operating conditions, a fixed reference level could be supplied to the detectors at terminal 141. For example, if A were constant at 0.1 volts/db, a constant reference level $V_x$ could be provided and R2 in detector D2 chosen so that $$(R1/R2)V_x = 3(0.1) = 0.3 \text{ volts}.$$

Similarly in detector D3, R3 could be chosen so that $(R1/R3)V_x = 6(0.1) = 0.6$ volts, etc. However, such is not the case in practice, since the overall gain or volts per db of the receiver 100, amplifier 114 and peak detector 116, i.e., A, tends to vary. Consequently, the reference level cannot be a constant $V_x$ but rather, a controllable level.

Such control is accomplished by periodically monitoring the gain of volts per db through the receiver 100, amplifier 114 and peak detector 116 to determine changes therein from a gain A, assumed to represent a normal condition and adjust the reference level supplied to terminal 141 in accordance therewith.

For a better understanding of the quantizer units, reference is made to FIG. 8 which is a waveshape diagram of two reference signals. To monitor the gain A, between video returns at preselected instances, a source of reference signals 140 (FIG. 5) is connected to the input of receiver 100 through a switch 142. Switch 142, which is of the type capable of switching radio frequency signals, connects receiver 100 either to the antenna 16 or to source 140. When source 140 is connected it effectively replaces the antenna, to supply the receiver with signals of known amplitudes. Source 140 may also be coupled to the receiver 100 through a suitable directional coupler.

Irrespective of the type of connection between source 140 and receiver 100, when actuated, the source 140 sequentially supplies to receiver 100, two pulses of equal durations and of known precise levels, such as 6db and 26db above a certain known level. In FIG. 8, the two pulses are designated by numerals 146 and 147. Each is of an equal duration $t1$, separated by a time duration $t2$. The output of the peak detector 116 (FIGS. 5 and 9) in response to each of the reference pulses, designated in FIG. 5, as REF. VIDEO is supplied to reference level control unit 150, the output of whch is connected to terminal 141 (FIG. 6).

Briefly, unit 150 compares the outputs of detector 116 in response to each of the reference pulses 146 and 147 (FIG. 8) by subtracting the output in response to pulse 146 from the output in response to pulse 147. Unit 150 temporarily stores or holds the difference until a subsequent pair of pulses are passed to receiver 100 from source 140.

Since the difference between pulses 146 and 147 is 20db, the difference between the outputs of detector 116 should be 20 times the normal gain per db. For example, if as heretofore assumed, the gain per db is 0.1 volts, the difference should be 20 (0.1) = 2 volts. If the difference is 2 volts, the unit 150 supplies a normal reference level to the detectors. If, however, the difference is other than 2 volts, indicating that the gain per db through receiver 100, amplifier 114 and detector 116 is other than normal, unit 150 adjusts the reference level accordingly.

Reference is now made to FIG. 9 wherein one embodiment of unit 150 is shown in greater detail. In FIG. 9, the peak detector 116 is shown comprising a boxcar detector which receives the amplified video from amplifier 114. As previously stated, the boxcar detector is assumed to be gated or reset at the beginning of each system time period, such as a range bin, to provide the peak of the video received during such range bin. The boxcar detector of circuit 116 is similarly gated at the beginning of reference pulses 146 and 147, to provide REF. VIDEO to unit 150 in response to each reference pulse.

Unit 150 includes boxcar detector 152a and 152b, both receiving the REF. VIDEO. Detector 152a is assumed to be gated by a timing signal at the beginning of reference pulse 146, so that after pulse 146 is supplied, the REF. VIDEO related thereto is represented by the output of detector 152a, which is supplied to one input of a subtractor 152c. Similarly, at the beginning of reference pulse 147, detector 152b is gated by a timing signal to provide an output to a second input of subtractor 152c, representing the REF. VIDEO related to pulse 147. The outputs of detectors 152a and 152b continue to represent the REF. VIDEO in response to pulses 146 and 147 until at a subsequent time a second pair of pulses are supplied by source 140 to receiver 100. All the timing signals for the boxcar detectors are supplied from a system timing source (not shown), in manners well known in the art.

In the meantime, subtractor 152c subtracts the output of detector 152a from the output of detector 152b. The subtractor's output which is supplied to one input of a difference amplifier 153, represents the difference between the peak outputs of detector 116 in response to pulses 146 and 147, which under normal conditions as herebefore assumed is 2 volts. Another input of amplifier 153 is connected to a terminal 154 which is in turn connected to a fixed potential, which in the present example is 2 volts. The output of difference amplifier 153 may in turn be amplified by an amplifier 155, whose output represents the controlled reference level supplied to the detectors D2 through D7 at terminal 141 (FIG. 6).

When the gain per db in the receiver 100, amplifier 114 and detector 116 is as expected, the two inputs to the difference amplifier 153 are the same so that a normal reference level is supplied to the detectors. However, any variation in the gain per db from the normal results in a difference between the two inputs of amplifier 153 which in turn affects the output of amplifier 155 to adjust the reference level to compensate for the change in the gain per db. That is, in the foregoing relationship, such as in D2 in which $3A - R1/R2$ REFERENCE LEVEL has to be equal to or greater than zero, any change in A is compensated for by a corresponding change in the reference level. Thus, the detectors of the present invention provide accurate indications of the peak of the video returns with respect to the system's RMS noise, despite changes in the gain per db of the input circuitry.

It should again be stressed that in the absence of the controlled reference signal, the detectors would provide correct indications of the number of db by which the PEAK VIDEO exceeds RMS noise only if the gain per db of the receiver 100, amplifier 114 and detector 116 were constant. However, since this does not generally happen in a practical case, only by providing the controlled reference level, as heretofore described, are the detectors capable of providing an accurate indication.

VIDEO VERIFIER 25

Reference is now made to FIG. 9a wherein there is shown the video verifier 25 comprising a 3-bit binary up/down counter 40 which has an input terminal 42 coupled to the output terminal of the video quantizer (No. 1) 24a (FIG. 1). Counter 40 has three outputs designated by the terms F1, F2 and F3 respectively. A second 3-bit binary up/down counter 44 has an input terminal 46 coupled to the output of video quantizer (No. 2) 24b. Counter 44 has three outputs designed by the terms L1, L2 and L3. The output term of counter 40 and counter 44 are coupled to logic means to enable flip flops 48, 50 and 52 designated F4, F5 and F6 respectively. Flip flop 48 provides an output F4 and a complementary output $\overline{F4}$. Flip flop 50 provides an output F5 and a complementary output term $\overline{F5}$. Flip flop 52 provides an output term F6 and a complementary output term $\overline{F6}$. The flip flops used in this particular embodiment are the type well known to those skilled in the art which are set on a true input applied to its set (S) terminal and is reset when a signal is applied to its reset (R) terminal.

The logic means which enable flip flop 48 includes an AND gate 54 which has its output coupled to the S input of flip flop 48. Flip flop 48 is enabled when an F1 signal and an output from the or gate 56 are applied to AND gate 54. Or gate 56 is enabled when an L1 from counter 44 is applied thereto or an output is provided from AND gate 58. AND gate 58 is enabled by the output terms L2, L3 from counter 44. Flip flop 50 is set by the output of AND gate 60 which is enabled by the term F2 and the output from OR gate 62. OR gate 62 is enabled by an L1, L2 or L3 output term from counter 44. Flip flop 52 is enabled by an F3 from counter 40. Each flip flop 48, 50 and 52 is reset by the complement of the signal applied to the set input terminal of the respective flip-flops. The up/down counters 40 and 44 count the video outputs above the predetermined levels provided by video quantizers 24a and 24b and are used to verify the relationship between the signals from the two quantizers to distinguish clutter from actual targets. The output terms F1, F2 and F3 provide a binary number, for example, where F1 is considered the most significant digit of that number, F2 the next significant digit of that number, and F3 the least significant digit of that number. Counter 44, on the other hand, provides the term L1 which is the most significant digit, L2 which is the next significant digit and L3 which is the least significant digit. The up/down 10-bit counter is used on each digital video to identify jamming pulses, for example. The up/down counters 40 and 44 in each path count up by 8 for each hit above 9db and down by one for each hit less than 9db unless clutter is detected which will inhibit the counter. Clutter is designated any time three or more adjacent range bins contain hits of 9db or greater as will be explained hereinafter. Pulse interference is designated whenever each counter reaches a count of 256.

The logarithmic FTC video provided by video quantizer (No. 1) 24a is range correlated with the limited type of video provided by video quantizer (No. 2) 24b so that the log FTC amplitude requires at least the listed value shown on the other channel. That is, the output of counter 40 must show the same listed value as output of counter 44 to be gated for further processing. The binary codes and their value and their rating in decibels is shown in the following table:

| LOG FTC | | LIMITED VIDEO | OUTPUT CODE | |
|---|---|---|---|---|
| 001 | requires | 000 | 001 | 3db |
| 010 | do. | 001 | 010 | 6db |
| 011 | do. | 010 | 011 | 9db |
| 100 | do. | 011 | 100 | 12db |
| 101 | do. | 100 | 101 | 18db |
| 110 | do. | 100 | 110 | 27db |
| 111 | do. | 100 | 111 | 39db |
| TABLE III | | | | |

VIDEO CORRELATOR 26

Reference is again made to FIG. 1 in which the video correlator 26 used in accordance with the present invention forms a part of a radar receiving system, designed to receive video returns from range sweeps which are transmitted in azimuth and elevation to detect the presence of radar targets.

The beam pattern for a radar system sequentially transmitting range sweeps in elevation, as the radar scans in azimuth, is diagrammed in FIG. 4 to which reference is made herein. Therein arrows 215, 216 and 217 represent the scan direction in elevation azimuth and range respectively. Columns $Z_4$–$Z_0$ represent successive azimuth scan positions, while rows $E_0$–$E_x$ represent different elevation positions in each of the azimuth locations. For explanatory purposes, it is assumed that 10 range sweeps are transmitted sequentially in elevation, beginning at the lowest elevation at each azimuth position.

It should be appreciated that with a range sweep assumed to be divided into 400 successive range intervals, in accordance with the teachings of the present invention, each range bin is equal to the radar pulse width. The video received by receiver 10, from each range bin, is quantized by video quantizer 24 into a 3-bit amplitude code, which is then supplied to video correlator 26 and automatic detector of this invention. A typical set of codes used to designate the relative amplitude of the returned video, generally designated by X, with respect to a threshold or skim level, is listed in the table shown in FIG. 3.

As seen therefrom, when the received video X is less than 3db above the threshold level, it is designated by a 3-bit code representing the number 0, as seen from line 1 of the table. Such a number will hereafter be referred to as a 0 code hit. On the other hand, when the return video X is equal or greater than 39db above the threshold level, a binary number 7 or a 7 code hit is supplied by quantizer 24, to video correlator 26. Other relative magnitudes of the return video with respect to the threshold level are designated by binary number 1 through 6 as shown in FIG. 3. It is the function of video quantizer 24 to convert the return video, received at each range bin from each range sweep into a 3-bit hit number, supplied to video correlator 26.

As previously indicated, the present invention is particularly useful in a pencil beam radar system, in which it has been found that target detection may greatly be enhanced by integrating or correlating the target energy or return video, appearing in range bins in adjacent range sweeps, which are all related to the same range interval. For example, the detection of a target in range bin B2 (see FIG. 4), representing a selected range interval, designated $R_x$, in azimuth position $Z_2$ and elevation $E_B$ need not be a function of only the quantized video received in such range bin, but also as a function of neighboring range bins, all relating the same range interval $R_x$. It has been found that when certain basic energy patterns are present in adjacent range bins, related to the same range interval, the probability of the presence of a target in such a range interval, even in the presence of noise and external interference, is greatly enhanced. Three such basic detection patterns are listed below:

1. Two hits, at least 9db above a given threshold level in adjacent azimuth or elevation positions.
2. Three hits with at least 9db, 6db and 3db amplitudes above the threshold level.
3. Four hits with three of them at least 6db and one with at least 3db amplitudes above the threshold level.

Thus, for example, for basic pattern type 1, a target is presumed to be detected in range bin B2 if the quantized video therein is at least a binary 3 number or a 3 code hit, indicating that return video was at least 9db above the threshold level and if similarly, the quantized video in either range bin B1 or A2 is similarly a 3 code hit, representing that the returned video is either of the 2 range bins also represents video at least 9db above the threshold level. On the other hand, for the type 2 pattern, the video in B2 must be a 3 code hit (at least 9db above the threshold level), while the other two hits may be a two code hit (at least 6db) and a one code hit (at least 3db). The other two hits for the type two pattern must occur in range bins either in the same elevation or in the same azimuth, as shown in the second, third and fourth rows of FIG. 10A. For basic detection pattern 3, four hits of minimum relative amplitudes must be received in adjoining range bins.

Figures 10A, 10B:
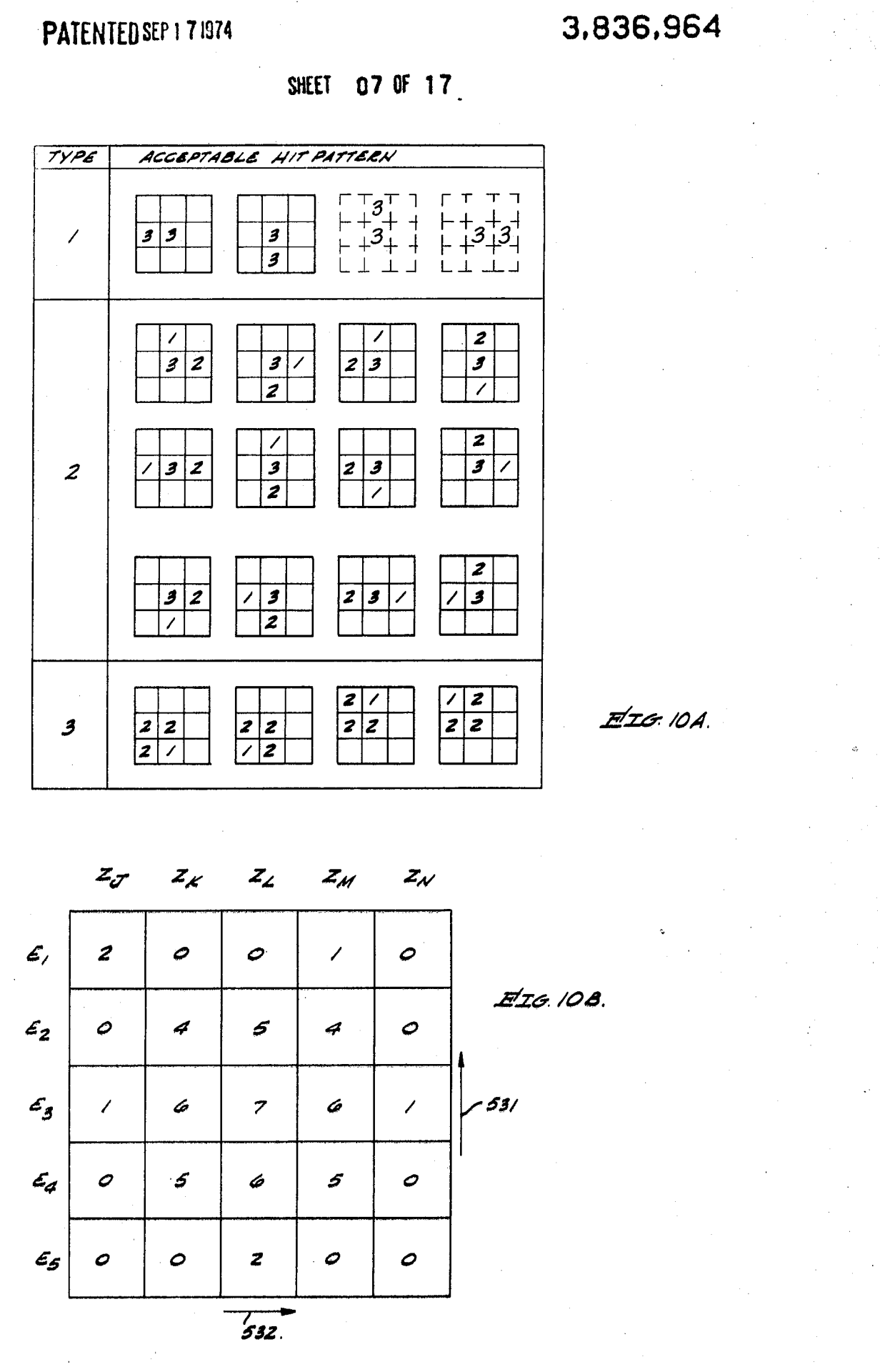

The various acceptable hit patterns for each of the three types of basic detection patterns are diagrammed in FIG. 10A. The number 1, 2 and 3 in each acceptable hit pattern designate 1 code hit, 2 code hit and 3 code hit respectively. In row one, related to type 1 hit patterns, the third and fourth hit patterns are shown by dashed lines since these patterns are used in detecting a target during succeeding elevation, and preceding azimuth positions respectively.

From the foregoing it should be appreciated that before a target can be assumed to be detected at any range bin, quantized video present in the other eight adjacent bins surrounding the particular range bin must be available. That is, quantized data from a 3×3 range bin matrix must be coincidently available to determine the presence of a target. Thus, for example, in the arrangement in FIG. 4, the presence of target in range bin B2 could only be determined after the quantized video from range bin C1, the last of the range bins in the 3×3 matrix surrounded by line 220 is received. Line 220 may be thought of as a window enclosing nine range bins each having a code representing quantized video received from the range represented thereby.

It should be pointed out that all the nine range bins, diagrammed in FIG. 4 and enclosed by line 220, are from the same range $R_x$, except that each stores the video returns from range during a different range sweep. It is the basic function of video correlator 26 to provide the quantized video from all of the nine range bins as 3-bit amplitude codes, in real time, as well as to automatically correlate the nine 3-bit hit code in accordance with the three types of basic detection patterns, hereinbefore described, to determine whether a target is assumed to be detected in the range interval $R_x$ represented by the range bin in the center of the 3×3 matrix. Before proceeding to describe video correlator 26 in greater detail, it should be recalled that each range sweep is divided into 400 range bins. And, at each azimuth position, range sweeps are sequentially transmitted in a plurality of elevated positions. For the example of ten elevation positions, video returns from each azimuth position are stored in 4,000 range bins.

Figure 11:
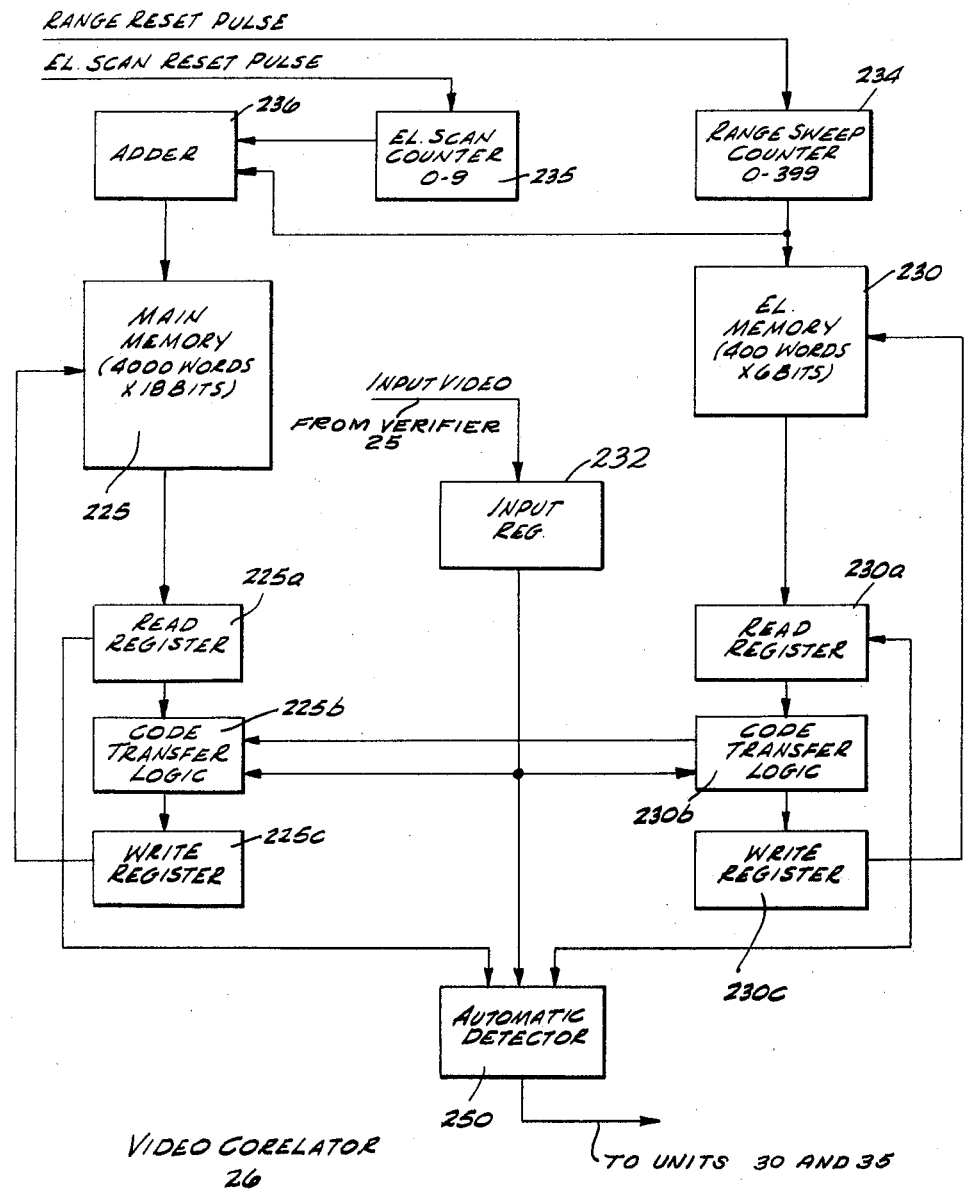
FIG. 11 is a block diagram of the video detector of the present invention.

Reference is now made to FIG. 11 which is a detailed block diagram of video correlator 26, shown in FIG. 1. The video correlator portion comprises a main memory 225 which, for the example used herein, is assumed to have a storage capacity of 4,000 words, each of 18 bits. Correlator 26 also includes an elevation memory 230 of a storage capacity of 400 words, each of six bits. Basically, for each one of the 4,000 range bins produced during each azimuth scanning position, main memory 225 contains an 18 bit word in which the 3-bit hit codes of six of the nine range bins, necessary for target detection are stored. On the other hand, elevation memory 230 contains two 3-bit words for each of the 400 range intervals into which each range sweep is divided. The last 3-bit hit code for the range bin of the incoming video is supplied directly through an input register 232, which is assumed to be connected to the video verifier 25 (FIG. 1), to receive the 3-bit hit code representing the actual video returns, in real time.

The addressing of memory 230 is controlled by a range sweep counter 234, which counts from 0 to 399, advancing the count during each range ben. Thus, each of the 400 words in memory 230 is addressed during each range sweep. On the other hand, the addressing of memory 225 is controlled by an elevation scan counter 235, counting from 0 to 9, the output of which is connected to an adder 236, which adder has another input connected to the output of counter 234. Counter 235 is energized by each elevation scan reset pulse, with adder 236 adding the outputs of counters 234 and 235, so that at each azimuth position each of the 4,000 words in memory 225 is addressed.

Memory 225 is associated with the read register 225a, the output of which is transferable through a code transfer logic 225b to a write register 225c. The write register is in turn connected to main memory 225 to transfer data thereto in a manner to be described hereinafter in detail. Similarly, memory 230 is associated with a read register 230a, which is connected through a code transfer logic 230b to a write register 230c, the output of which is connected to the memory 230. In addition, code transfer logic 230b is connected to transfer 3-bit hit codes to transfer logic 225b, while both code transfer logics 230b and 225b are connected to receive the output of input register 232.

For a complete explanation of the mode of operation and structure of video correlator 26, reference is again made to FIG. 4 and to FIGS. 12 and 13. In FIGS. 12 and 13, read register 225a associated with main memory 225 is shown comprising six 3-bit blocks designated 241 through 246, while the read register 230a associated with elevation memory 230 is shown comprising of two 3-bit blocks, designated 248 and 249. Each block is of three bits; the most significant bit, the second most significant bit, and the least significant bit being designated by r, s and t respectively.

In operation, when the quantized video is supplied by the video quantizer 24a and 24b (FIG. 1), to input register 232, representing the video in range bin C1, at azimuth position $Z_1$ and elevation $E_C$ at the selected range $R_x$, the main memory 225 supplies to read register 225a and 3-bit codes representing the quantized video in related range bins in previously scanned azimuth positions $Z_2$ and $Z_3$, at the same elevation $E_C$ as well as in two lower elevation scans $E_B$ and $E_A$. Thus, when the 3-bit code of C1 is supplied to input register 232, the 3-bit codes of range bins A3, A2, B3 and B2, C3 and C2 are supplied and temporarily stored in blocks 241 and 246 respectively of read register 225a.

At the same time, the elevation memory 230 transfers to read register 230a, the 3-bit codes representing the quantized video in range bins at the azimuth position $Z_1$ of C1, but at two lower elevation scans, i.e., $E_B$ and $E_A$. That is, the 3-bit code of range bin B1 is transferred into block 248, while the 3-bit code of range bin A1 is transferred to block 249 of read register 230a. As a result, the 3-bit codes of all the nine range bins forming the window, defined by line 220 in FIG. 4, are available in time coincidence, and in real time with the arrival of the 3-bit code representing the video of range bin C1.

Figure 14:
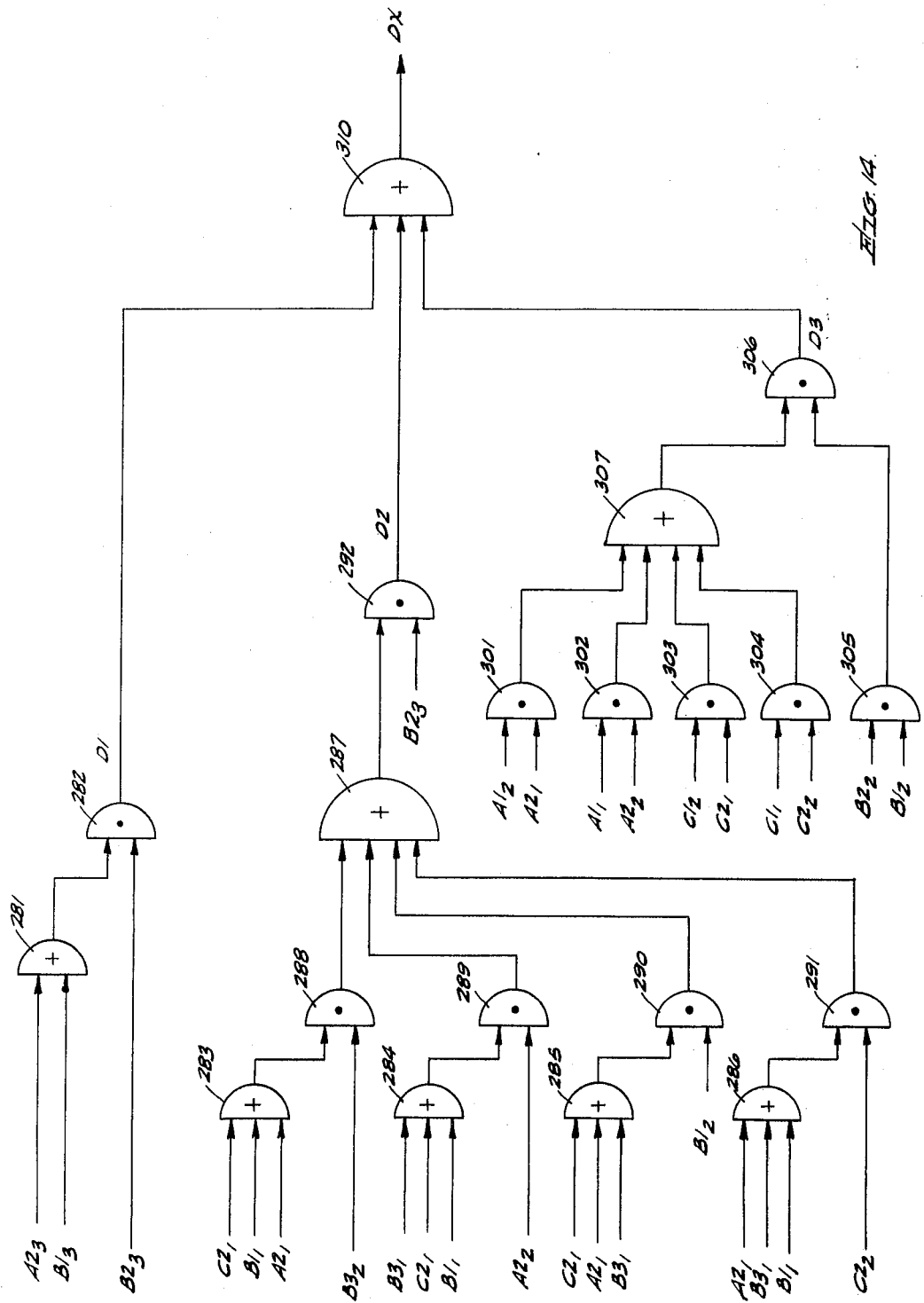

To determine whether any of the acceptable hit patterns, such as those diagrammed in FIG. 10A, is present in any combination of the nine range bins, the output of blocks 241 through 246 of read register 225a, input register 232, and blocks 248 and 249 of read register 230a, are supplied to an automatic detector designated by numeral 250 in FIG. 11, and which is represented in FIG. 13 by a plurality of gates and by the plurality of gates diagrammed in FIG. 14 to which reference is made herein.

Briefly, each block of 225a, 232 and 230a is associated with four gates, interconnected with the r, s and t outputs of the block in order to provide three output signals which are a function of the 3-bit code in the particular block. For example, in FIG. 13, block 241 is shown associated with OR gates 261, 262, and 263, and an AND gate 264. OR gate 261 responds to the three outputs of block 241, while OR gate 262 is connected to the r and s outputs of block 241, representing the most significant and the second most significant bits therein. OR gate 263, on the other hand, is directly connected to the r output of block 241 and to the output of AND gate 264 having two inputs connected to the s and t outputs of block 241. The outputs of gates 261, 262 and 263 are designated $A3_1$, $A3_2$ and $A3_3$ respectively.

Recalling TABLE I and FIG. 3, it should be appreciated by those familiar with the art that when at least a 1 hit code is stored in block 241, the output $A3_1$ is true, while the output $A3_2$ is true whenever the hit code in block 241 is at least a 2, representing that the video return is at least equal to or greater than 6db above the threshold level. On the other hand, the output $A3_3$ is true whenever the 3-bit code in block 241 is at least a 3 hit code, which occurs whenever the video return is at least equal to or greater than 9db above the threshold level.

Each of the other blocks has a similar gating combination connected therewith. For simplicity, however, in FIG. 13 only the gates associated with blocks 241 and 249 are diagrammed. The gates associated with block 249 are designated by numerals 271, 272, 273 and 274 respectively.

The outputs of the gates associated with each of the blocks is supplied to the gating arrangement, diagrammed in FIG. 14. Briefly, this gating arrangement performs the logic necessary to determine whether any of the acceptable hit patterns is present in the 3×3 range bin matrix forming the window as shown in FIG. 4. For example, to determine whether a type 1 hit pattern is present, gate outputs $A2_3$ and $B1_3$ are supplied to an OR gate 281, the output of which is connected to one input of an AND gate 282, the other input of which is connected to output $B2_3$. Only when range bin B2 temporarily stored in block 244 contains a three hit code and either of range bins $A2_3$ or $B1_3$ temporarily stored in data blocks 242 and 248 respectively, also contains a three hit code is the output of AND gate 282, designated D1, enabled true, thereby indicating that either one of the two acceptable patterns of type 1 are present in the range bin matrix.

Whether any of the type 2 patterns is present is determined by OR gates 283 through 287 and AND gates 288 through 292. The output of AND gate 292, designated D2, is true only when one of the type 2 patterns is present. For example, when the first type 2 pattern, diagrammed in FIG. 10A in row 2, column 1 is present, range bin B2 stores a 3 hit code thereby providing one true input to AND gate 292. Also, OR gate 283 is energized since input $C2_1$ is true and since at the same time the other input of AND gate 288, i.e., $B3_2$ is true since range bin B3 stores a 2 hit code, the output of AND gate 288 is true. This in turn enables OR gate 287 to provide a true input to AND gate 292. As a result, both inputs of AND gate 292 are true, thereby enabling the gate to provide a true output D2.

Whether any type 3 hit pattern is present, is automatically determined by AND gates 301 through 306 and OR gate 307. The output of AND gate 306, designated D3 is true only when the hit codes in range bins B2 and B1 are at least 2, and two other adjacent range bins store at least a 1 hit code and a 2 hit code. The D1, D2 and D3 outputs of AND gates 282, 292 and 306 are connected to three inputs of an OR gate 310, whose output designated $D_X$ is true only when any one of the acceptable hit patterns is present, among a selected combination of the nine range bins, forming the window.

From the foregoing, it should thus be appreciated that by providing, in time coincidence, the 3-bit codes stored in each of the nine range bins forming the window, the logic circuitry incorporated in the automatic detector 250 is capable of automatically determining whether any of the acceptable hit patterns is present to provide a true output whenever such presence is detected. Thus, the energy received in a plurality of adjacent range bins during different range sweeps from the same range interval ($R_x$) is integrated to increase the probability with which a target may be detected.

In addition to providing automatic target detection capabilities, video correlator 26 includes a code transfer arrangement whereby the codes stored in the word received from the main memory 225, and temporarily stored in read register 225a is updated for a subsequent read operation. Similarly, the 6-bit word transferred from elevation memory 230 to read register 230a, and temporarily stored as B1 and A1 in blocks 248 and 249 is updated for subsequent operation.

For a better explanation of this feature of video correlator 26, reference is again made to FIGS. 4 and 12.

Again it should be pointed out that the matrix enclosed in window 220 represents the case in real time, when quantized video is entered into range bin C1 at an azimuth $Z_1$ and elevation $E_C$ from range $R_x$. From the foregoing, it should be appreciated that when this occurs, the main memory transfers a word to the read register which represents the 3-bit codes in range bins C2, C3, B2, B3, A2 and A3 respectively. Thus, it should be appreciated that 4,000 radar clock pulses later when the video is received for range bin C0 at azimuth position $Z_0$ at the same elevation, i.e., $E_C$ and at the same range, the information that need be read out from the main memory must consist of the 3-bit codes in range bins C1, C2, B1, B2, A1 and A2, This is accomplished by providing within write register 225c six 3-bit blocks designated 251 through 256 respectively. The input register 232 is connected through the code transfer logic 225b to block 256 so that the 3-bit code representing C1 may be stored therein, while block 246 of read register 225a is connected to block 255 to store the 3-bit code of C2 therein. Similarly, block 254 is connected to block 248 in read register 230a, block 253 is connected to block 244, block 252 is connected to block 249, and block 251 is connected to block 242.

During the time that automatic detector performs the logic operation necessary to determine the presence of any of the acceptable hit patterns, the 3-bit content of blocks 242, 249, 244, 248, 246 and 232 is transferred bit-by-bit into blocks 251 through 256 respectively, to store therein the 3-bit codes representing the quantized video in A2, A1, B2, B1, C2 and C1 respectively. Then, during the write cycle of operation, the content of blocks 251 through 256 is transferred to the same address location in memory 225, to be available for readout into the read register 225a, 4,000 radar clock pulses later when in real time, the quantized video of range bin C0 is supplied to the input register 232. Thus, the mechanization previously described may be thought of as that consisting of a moving detection window, moving in azimuth from right to left to update the 3-bit codes representing video of six of the range bins necessary for the 3×3 range bin matrix.

A similar data updating is performed in the data stored in elevation memory 230 by means of write register 230c. Again referring to FIG. 4, it is appreciated that when the quantized video of range bin C1 is received, the 6 bits read from memory 230 and present in blocks 248 and 249 or read register 230a comprise the 3-bit codes of the lower range bins B1 and A1 in the same azimuth position $Z_1$. However, 400 clock pulses later, when the system is quantizing and receiving the video from range bin D1, one elevation range sweep higher, the necessary information from the memory is the quantized video of range bins C1 and B1.

Such updating is accomplished by connecting block 258 of write register 230c (FIG. 12) to the output of the input register 232, as well as connecting the input of a block 259 of the same write register to the output of block 248 of read register 230a. Thus, whereas during the reception of the video of C1, the memory 230 reads out the video of B1 and A1, the data re-stored in the same address location is that representing the video of C1 and B1 to be available 400 radar pulses later for use with the quantized video of range bin D1 and the quantized video from the other six range bins provided by main memory 225.

The foregoing description of video correlator 26 of the system of this invention is designed to provide a target indicating signal on the basis of energy returns in a plurality of interrelated adjacent range bins from the same range interval $(R_x)$. In the foregoing example, the presence of a target at a range interval $R_x$ at azimuth position $Z_2$ and elevation $E_B$, i.e., in range bin B2, is determined by intergrating the video returns from range bin B2 representing such range interval with the video returns from eight other range bins, all from the same range interval $R_x$, but at different azimuth positions and different elevations. Only when the 3-bit code of range bin B2 and that of the adjacent range bins are in predetermined amplitude relationships and predetermined patterns is a target indicating signal $(D_x)$ produced and supplied to control unit 35 and gate 30. That is, only when one of the acceptable hit patterns, such as diagrammed in FIG. 10A is present, is a target indicating signal produced.

As previously explained, video correlator 26 includes two memories which are updated during each range bin period so that the correlation necessary to produce the target indicating signal may be performed in real time with the arrival of the quantized video from the last range bin forming part of the range bin matrix to be correlated. In the foregoing example, a 3×3 range bin matrix has been described. However, it should be appreciated that a larger matrix may be employed. Also, the particular acceptable hit patterns in such a case may be extended to include other acceptable hit patterns, all of which may be implemented by the logic of automatic detector 250. For example, each of the words in the main memory 225 may store the quantized video of five range bins in each of four preceding azimuth positions. In such a case, each of the words in the memory 225 will consist of 60 bits, for a total storage capacity of 20 3-bit codes. Similarly, the storage capacity of each of the words in elevation memory 230 will be increased to store four 3-bit codes, representing the quantized video of range bins in the same azimuth position as that received in real time, but from four preceding elevation positions.

CONTROL SYSTEM 35

Reference is again made to FIG. 1 and also to FIG. 15 which is a general block diagram of a detection system of the present invention wherein the criteria control system 35 is shown in semi-detailed form. Reviewing the system of this invention, radar transmitter-receiver (T-R) system 10 which, in synchronism with a master trigger signal, derived from range counter 12, applies pulses of energy to antenna control system 14 which includes a rotating surveillance antenna 16. It is assumed that the antenna rotates in a horizontal plane in a clockwise direction, as indicated by arrow 18 in FIGS. 1 and 2a. Each complete revolution represents a complete radar scan. At each of a plurality of azimuth positions, shown in FIG. 2a, pulses of energy are sequentially transmitted into space from antenna 16 at a plurality of elevations. These pulses and the directions in which they are transmitted and from which reflected signals are received may be thought of as range sweeps.

Range counter 12 (FIG. 1) defines a plurality of range bins or intervals in space along each range sweep from which reflected energy may be received by antenna 16. Pulses necessary to control range counter 12, as well as to various logic circuits, such as gates and flip flops to be described hereafter in detail, may be provided by clock 20. The output pulses of clock 20 hereafter referred to as clock pulses are designated by C.

The energy reflected to antenna 16 from radar targets which may include meaningful targets, such as aircrafts, and undesired targets such as clutter, is supplied to the system of this invention. Therein video returns from each range bin are developed at video frequency by mixing and envelope detecting techniques, which are well known in the art. The output of the system of this invention during each system time period thus represents the video returns from a different range bin.

As is appreciated by those familiar with the art, in advanced track-while-scan radar systems, such video returns are generally first quantized in quantizers 24a and 24b and verified by verifier 25 before they are processed or correlated by correlator 26 to determine whether they represent meaningful targets to be tracked. It is the output of correlator 26 that represents detected targets or target reports which are generally supplied to a utilization device 29. Such a device may comprise a target display device and/or a target storing memory, used for target tracking. In FIG. 1, the target reports from correlator 26 are shown supplied to device 29 through a gate 30.

In the absence of the control system 35 these 3-bit code hits are directly supplied to the video correlator 26. In one embodiment, the correlator produces a target report only when a plurality of code hits of certain values are present in a plurality of related adjacent range bins, meeting certain designated patterns. This aspect of the exemplary video correlator 26 may better be explained in conjunction with FIG. 4. Therein, each of the diagrammed squares represents a 3×3 range bin matrix. The numbers 1, 2 and 3 represent respectively code 1 hits, code 2 hits and code 3 hits of the type supplied to the correlator 26 from the quantizer 24.

Reference is made again to FIGS. 1, 2a and 2b. In FIG. 1, the criteria control system 35 is diagrammatically represented by the subtractor 28 and gate 30, herebefore referred to, and by the various blocks shown in FIG. 15. Briefly, the entire radar surveillance volume as represented by the plan and side views of FIGS. 2a and 2b respectively, is divided into incremental volumes. As previously stated, it is assumed for the purpose of this explanation that each incremental volume is 4° in azimuth (FIG. 2a), 4 miles in range (FIGS. 2a and 2b) and 1 elevation in height. Recalling the example that each range bin is 1° in azimuth, 500 yards in range and 1 elevation in height, each incremental volume in essence includes 4×16 = 64 range bins. A target is assumed to be detected in an incremental volume if correlator 26 produces a target report for any one of the range bins in the incremental volume.

As seen from FIGS. 1 and 15, control unit 35 includes a memory of detection history codes 340 and a detection criteria control logic stage 342. Briefly, memory 340 stores a multibit code, for example 5 bits, for each incremental volume of the radar surveillance volume. This code represents the prior history of detected targets or target reports from any of the range bins in the particular incremental volume. For explanatory purposes, the 5-bit code may be thought of as representing the target detection history of the incremental volume.

The 5-bit code of each incremental volume is read out from memory 340 to logic stage 342 in real time with the incoming coded video of all of the range bins comprising the incremental volume. An incremental volume address generator 344 (FIG. 15) which receives range, azimuth and elevation signals as the antenna is rotated in azimuth and elevation, as previously described, provides addressing instructions to memory 340 for such real time code readout. One embodiment of address generator will be described hereinafter in greater detail. These codes are utilized by logic stage 342 to control subtractor 28.

The function of stage 342 is to control subtractor 28 to modify the coded video from verifier 25 received from range bins included in a single incremental volume as a function of the 5-bit code of the particular incremental volume. The coded video modification is achieved by subtracting a 1 or 2 from the 3-bit coded video, depending on the target detection history of the volume. From the foregoing description of quantizers 24a and 24b and correlator 26, it should be appreciated that by subtracting a 1 or a 2 from a 3-bit coded video, larger peak video returns must be received before a target report is produced by correlator 26. Thus, the subtraction may be thought of as a technique whereby the detection sensitivity is decreased. Also, it may be regarded as a technique of tightening the detection criteria. In some situations, all target reports from all range bins of an incremental area are blanked; that is, prevented from being supplied to the utilization device 29. This is done whenever a target is detected in a volume during each of a preselected number of successive update cycles despite continued tightening of the detection criteria.

The 5-bit code associated with each incremental volume is updated during a multi-scan update cycle which occurs during each of a succession of time intervals such as one minute. Thus, at any given time, except during an update cycle, the code represents the target detection history of its volume and is used to control the detection sensitivity of targets from each of the range bins of the incremental volume. Hereafter, for explanatory purposes, the output of correlator 26, in addition to being referred to as a target report, may also be regarded as indicating detection in an incremental volume, if a target report is produced for any of the range bins in the incremental volume.

For a more complete explanation of the use of the 5-bit codes to control the detection sensitivity and the manner in which the codes are updated, reference is first made to FIG. 16 which is a simplified chart of five 5-bit codes and an explanation of what each code represents. The codes, numbered 1 through 5, control subtractor 28 and gate 30 in real time as coded video is received from the various range bins.

When coded video is received from a range bit in an incremental volume whose 5-bit code is number 2, logic stage 342 causes subtractor 28 to subtract a 1 from the coded video from verifier 25. Thus, if the coded video is a code 3 hit, which as seen from FIG. 3 indicates that the peak video exceeds RMS noise by more than 9db, a 1 is subtracted from the code 3 hit so that only a code 2 hit is supplied to correlator 26. As a result, a stricter target detection criteria is applied to all the returns from the particular incremental volume. An even stricter criteria is applied if the 5-bit code of an incremental volume is a code 3, in which case 2 is subtracted from the coded video from verifier 25.

When an incremental volume is represented by code 4, rather than control subtractor 28, gate 30 (FIG. 1) is closed, blanking or preventing target reports from correlator 26 from being supplied to utilization device 29. Codes 1 and b 5 do not affect the sensitivity of target detection. However, these two codes are used during a subsequent update cycle, during which all the codes are subject to change.

Briefly, the control unit 35 operates on the reasonable assumption that a meaningful target, detected in an incremental volume during one update cycle, would move out of the volume by the time the next update cycle takes place, for example, one minute later. If it does not, the code is updated to reduce the detection sensitivity such as by 3db, in every range bin of the incremental volume, thereby making subsequent detection more unlikely. If detection nevertheless occurs during a subsequent update cycle, in any of the range bins the detection sensitivity for the incremental volume is further reduced. Finally, all target reports are blanked from an incremental volume if, despite the reduction of detection sensitivity of coded video from the volume's range bins by 6db, target reports are still received from any of the range bins.

Since the size of incremental volumes which are further removed from the radar receiver are larger than those closer to it, it may be desirable to update the codes of all volumes beyond a certain range from the receiver at larger intervals than one minute. However, to simplify the following description, it is assumed that the codes of all the incremental volumes are incremented at one minute intervals.

In the exemplary embodiment, the update cycle occurs during three successive radar antenna scans, i.e., three complete revolutions of antenna 16. The possible code modifications which may take place during scan 1, scan 2 and scan 3 of the update cycle are diagrammed in FIGS. 17, 18 and 19 respectively. In FIGS. 17 and 18, the lefthand column represents the codes which are read out from memory 340 during scans 1 and 2 of the update cycle. The second column headed "LOGIC PERFORMED" indicates some of the logic operations performed by stage 342 during these scans as a function of the read out codes. The next two columns include the codes which are written back into memory 340, depending on whether during the scan a target report or detection is received from correlator 26 (FIG. 1).

Summarizing the operation of control system 35 during scan 1 of an update cycle, if the codes read out are 1 or 5, represented by 00000 and 00001 respectively, they are rewritten into the memory regardless of whether a target report or detection is received from any of the range bins of the incremental volume. During scan 1, code 2 does not cause subtractor 28 to reduce the coded video by 1. Codes 3 and 4 cause subtractor 28 to subtract 1 and 2 respectively from the coded video. Also, during scan 1, if the code from memory is a 2, a 3 or a 4, gate 30 (FIG. 1) is closed, blanking the supply of any target reports to target utilization device 29. If during scan 1, a target report is not received, codes 2, 3 and 4 are rewritten into memory unaltered. However, if during the scan, a target report is received, the codes are modified by setting their least significant digits (LSD) to a "1" state.

From the two righthand columns of FIG. 17, it is seen that eight different codes may be rewritten into memory 340 at the end of scan 1 of the update cycle. These appear in order in the lefthand column of FIG. 18 as the codes which may be read out during scan 2 of the update cycle. During scan 2, if a code 2, represented by a "1" in the second LSD, is read out, a 1 is subtracted from the coded video from verifier 25. A 2 is subtracted if the code read out is a 3, as represented by a "1" in the middle or center bit of the 5-bit code. Subtractor 28 does not affect the coded video from verifier 25 on codes 1, 4 and 5. Also, if code 4 is read out, gate 30 is closed to blank the supply of target reports.

If, during scan 2, a target report is not produced by correlator 26, the codes which are read out are rewritten in memory 340 unaltered. However, if a target report is produced, the codes are rewritten with the second most significant digit (MSD) in a "1" state. Such codes are shown in the righthand column of FIG. 18.

Therefore, during scan 3 of the update cycle, the various codes which may have been rewritten during scan 2 are updated as shown in FIG. 19. Therein, in the second column from the right are listed the possible codes which may be read out from memory 340. The interpretation of such codes are listed in the lefthand column. The righthand column includes the final updated codes at the end of the update cycle. It should be pointed out that in this column are shown only the five different 5-bit codes listed in FIG. 16. A few interpretations of FIG. 19 are included hereafter for explanatory purposes.

From the first row of FIG. 19, it should be appreciated that if the code at the beginning of the cycle was a 1 (00000) and a target report is not received during scan 2, the code is rewritten as a 1 (00000) indicating the absence of a target report during the update cycle. If, however, a target report is received during scan 2 (second row of FIG. 19), the code is updated to 5 (00001) to represent a detection in the update cycle. Similarly, if at the beginning of the cycle the code read out is 5 (the last row) indicating detection during the last update cycle and a target report is received during scan 2, the code is updated to 2 (00010). Consequently, until the next update cycle, the coded video from all range bins in the incremental volume will be modified by the subtractor by subtracting 1 from them and thereby decrease the detection sensitivity or increase the detection criteria. As previously stated, the reasoning underlying such a processing step is based on the assumption that any meaningful target in an incremental volume, detected during one update cycle, would move out of the volume before a subsequent update cycle. However, if it does not, as manifested by the fact that a target report is produced during two successive update cycles, the code associated with the volume is updated to 2 which thereafter subtracts a 1 from the coded video and thereby tightens the detection criteria in the volume.

If, however, the code at the start of an update cycle is 5 and no target detection occurs during the update cycle (row 15), the code for the volume is updated to 1 (00000), indicating no detection during the last cycle. As a result, the coded video from the volume which is received remains unaffected. Each of the other rows of FIG. 19 represents a different relationship between a code at the start of an update cycle and the updated code as a function of detection, i.e., receipt of a target report during the cycle or the absence thereof.

The teachings described may be summarized as disclosing a system for controlling the detection criteria of target reports from range bins in an incremental volume as a function of a 5-bit code which represents the target detection history in the volume. The code is updated during each of a succession of update cycles. Between update cycles all coded video from every range bin in the incremental volume is subject to modification as a function of the 5-bit code. The foregoing described codes and the criteria used for updating are based on the assumption that any meaningful target detected in an incremental volume during any given update cycle should move out of the volume by the time the next update cycle takes place, which was assumed to be one minute. If, however, during the next update cycle a target report is again received, indicating that the target has not moved out, the 5-bit code for the volume is incremented to 2 (FIG. 16) so that all coded video from the incremental volume are reduced by 1. Consequently, a stricter detection criteria is applied to all returns from the volume to detect a target therein.

If, despite the stricter criteria, a target report is produced during the next update cycle, the 5-bit code is raised to 3, further tightening the detection criteria. Finally, all target reports from a volume may be blanked if even after reducing the 3-bit code hits by 2, representing a 6db reduction, target reports are still produced. Such a capability greatly increases the system's capability to distinguish between meaningful and insignificant targets. By blanking reports from stationary or undesired targets, as well as tightening the detection criteria to eliminate detection of such targets, the number of false target reports supplied to the utilization device is greatly reduced. Consequently, the danger of saturating the device is greatly reduced.

The advantages realized by control unit 35 are greatly dependent on the fact that the 5-bit code of each incremental volume is read out in real time with the coded video returns from the various range bins comprising the volume. Briefly, this is accomplished by generating addressing signals in address generator 344 (FIG. 15) as a function of the azimuth and elevation positions of antenna 16 as controlled by unit 14 and range signals derived from range counter 12 (FIG. 1).

Figure 20:
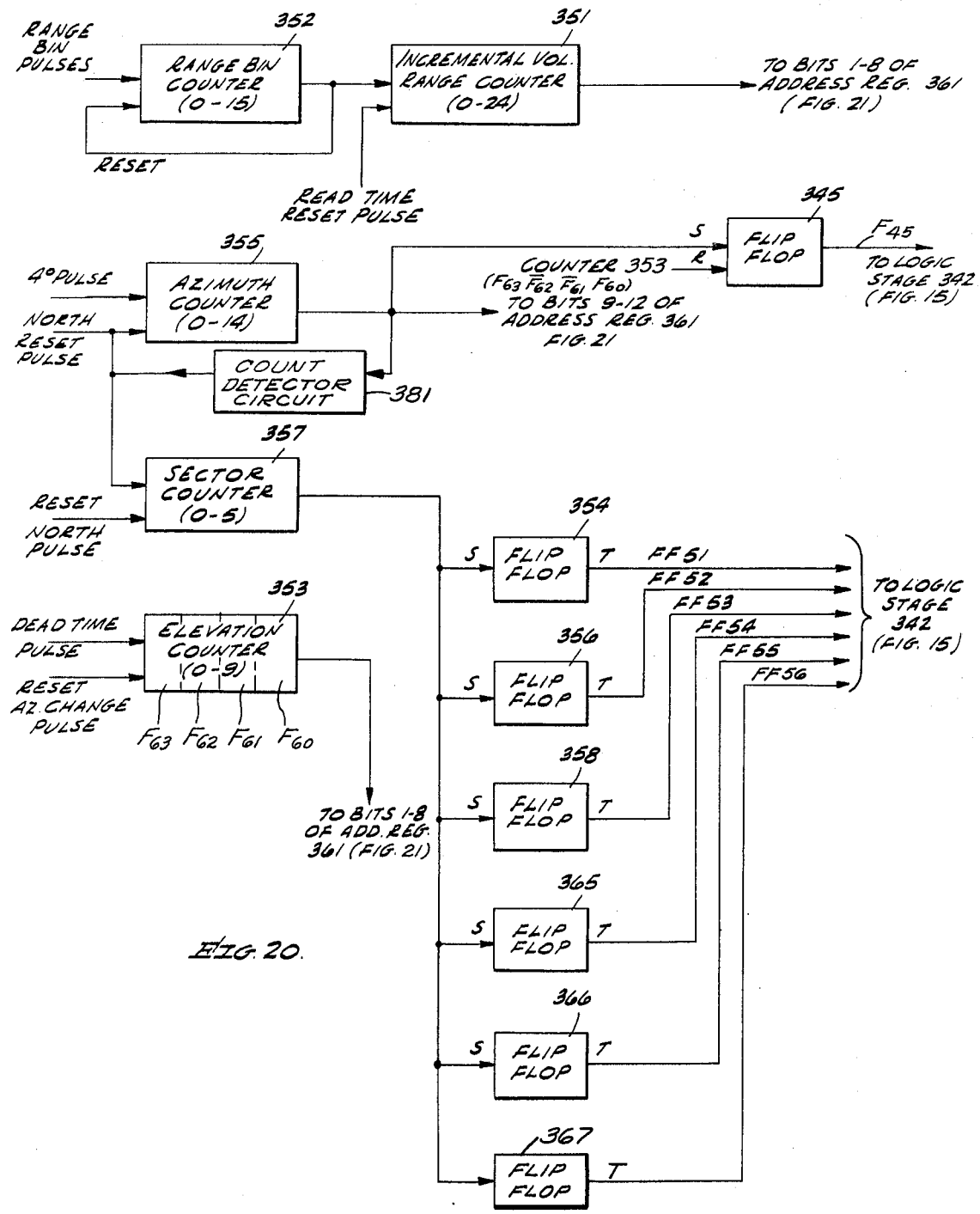
FIG. 20 is a block diagram of the address generator shown in FIG. 15.

One exemplary embodiment of the address generator is diagrammed in block form in FIG. 20 to which reference is made herein. Generator 344 (FIG. 15) includes an incremental volume range counter 351 (FIG. 20) which is incremented by one each time a range bin counter 352 reaches its maximum count and is reset. Counter 352 which has a maximum count of 16 is advanced by range bin pulses from range counter 12 (FIG. 1). As previously assumed, each range bin has a range of 500 yards. Thus 16 range bin pulses represent a range of 4 nautical miles.

Counter 351 is incremented after each group of 16 range bin pulses since the range of each incremental volume is assumed to be 4 nautical miles. The count in counter 351 which reaches a maximum at the end of each range sweep of 100 miles, is used to control a portion of an address register 361 of memory 340. Register 361 and other parts of memory 340 are diagrammed in FIG. 21 to which reference is made herein. Memory 340 includes a storage unit 362 organized at 30 bit words, each word having its unique address locations, as is well known in the art of computers.

The entire radar surveillance volume is divided into six sectors, as shown in FIG. 2a, each of 60°. Sector 1 covers azimuth range of 0°–59°; sector 2, 60°–119°; sector 3, 120°–179°; sector 4, 180°–239°; sector 5, 240°–299°; and sector 6, 300°–359°. Each memory word contains the 5-bit codes for incremental volumes in the same range, same azimuth range and same elevation within each sector.

Thus, each column of 5 bits in unit 362 includes all the codes for all the incremental volumes in one sector. Since each incremental volume is 4 miles in range, 1 elevation in height and 4° in azimuth, each 4°, azimuth segment contains 250 incremental volumes. The codes for each 4° azimuth segment are successively stored in unit 362.

Figure 21:
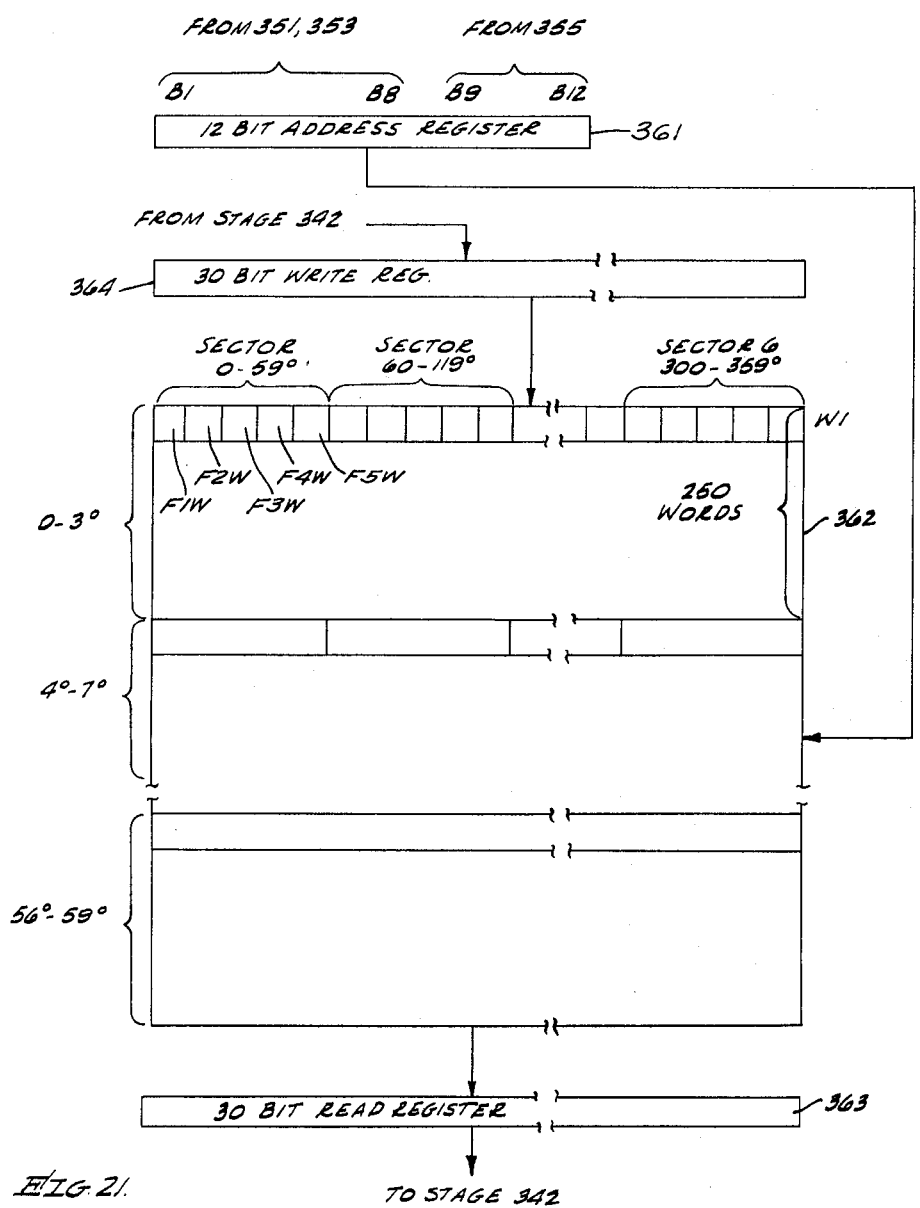
FIG. 21 is a block diagram of memory data blocks of the history codes shown in FIG. 15.

As diagrammed in FIG. 21, the first 250 words defining one group contain the codes for incremental volumes in azimuth segment of 0°–3° in the six sectors, while the codes of incremental volumes in the 4° azimuth sectors, 4°–7°, 8°–11°. . . 56°–59°, are stored in succeeding words of 250 per group.

As previously indicated, the output of incremental volume range counter 351 (FIG. 20) is used to control part of address register 361 (FIG. 21) to control which word is addressed. In addition to counter 351, the address generator 344 (FIG. 15) includes an elevation counter 353 (FIG. 20) which has a maximum count up to 9 and is reset for a total counter of 10 (including 0). The counter 353 includes flip flops F63 to F60 with the flip flop F60 representing the least significant bit of the count. The count therein is advanced in response to dead time pulses supplied by antenna system 14 (FIG. 1) as the antenna elevation is changed from one elevation such as EL1 (FIG. 2b) to another. Thus, at each antenna azimuth position, a full count is reached in counter 353 which is reset by an azimuth change pulse from unit 14 (FIG. 1) when the antenna is turned to a new azimuth position assumed before to be at 4° azimuth intervals.

In addition, as azimuth counter 355 (FIG. 20) is used to provide an output to indicate the azimuth segment within which the antenna is positioned. The count of counter 355 is advanced in response to 4° pulses from antenna unit 14, and is reset after a count of 14 is reached therein for a total count of 15. The count of 14 is detected by a conventional count detector circuit 381. Counter 355 is also reset by a NORTH pulse when the antenna sweeps across the NORTH direction which is assumed to be 0°. In FIG. 20, the output lines of counters 351, 353 and 355 are shown as single lines. However, in practice each counter has a plurality of lines, the combination of which is used to provide a plurality of binary signals which represent the specific count therein.

The outputs of counters 351 and 353 are supplied to the first 8 bits of address register 361, while bits 9 through 12 are supplied with the output of counter 355. In practice, the output or count of counter 355 controls which group of 250 words is addressed, recalling that since each sector is of 60° and each group of words represents an azimuth segment of 4°, there are 15 groups of words. For example, when the count in counter 355 is 0, the first group 0°–3° is addressed. Within the group, a word is addressed as a function of the counts in counters 351 and 353. When the count in counter 353 is 0, the first sub-group of 25 words is selected with the specific word which is actually addressed or selected depending on the count of counter 51. Thus, as the antenna scans the surveillance volumes, the words in memory are read out in real time. The entire memory is read out as the antenna is rotated by 60° or once each sector.

Each addressed word is read into a 30 bit read register 363 (FIG. 21) whose content is transferred to the logic stage 342 for code updating or to control subtractor 28 to modify the coded video from quantizer 24, as hereinbefore described. However, since at any given time the antenna is only in one azimuth position in one sector, it is necessary to provide signals to control stage 342 to enable the logic therein to determine in which sector the antenna is positioned so that only the portion of the word representing the code of an incremental volume in the particular sector and particular azimuth position is operated upon.

Such signals are supplied by flip flops 354, 356, 358, 365 and 366 and a sector counter 357, shown in FIG. 20. Briefly, the count in counter 357 is advanced every time antenna 16 (FIG. 1) is positioned in a new sector, which is sensed when counter 355 reaches a maximum count and is reset. Thus, when the count of counter 357 is 0 through 5, the antenna 16 is in sectors 1 through 6 respectively. The output of counter 357 is supplied to the set (S) input of the six flip flops 354, 356, 358, 365 and 366 which are assumed to be of the clocked type. Also, like counter 357, the flip flops are assumed to be reset by a NORTH pulse supplied by unit 14 each time the antenna completes a radar scan, i.e., a complete revolution. Flip flop 354 provides a true (T) output when the count in counter 357 is 0 indicating that the antenna is in sector 1. Similarly, the remaining flip flops 356, 358, 365 and 366 provide true outputs when the antenna is in any of sectors 2-6 respectively. These outputs are supplied to logic stage 342 wherein they are utilized to control which portion of a word supplied thereto from read register 363 (FIG. 21) is to be updated.

From the foregoing description, it should be appreciated that with the arrangement shown in FIGS. 15, 20 and 21, the 5-bit code, representing each incremental volume, can be read out in real time with the incoming coded video from the range bins comprising the volume. It should, however, be recalled that the updating of the code is performed only during a defined sequence of scans of an update cycle which occurs at fixed intervals, such as one minute. Thus, it is necessary to supply logic stage 342 with signals indicative of the update cycle and the scans thereof.

Figure 22:
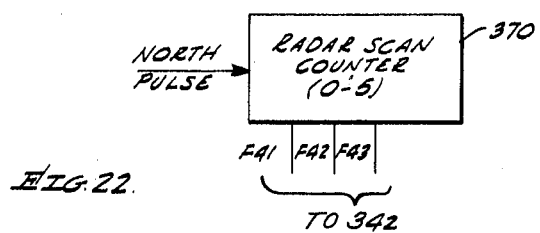
FIG. 22 is a simple diagram of an update cycle logic unit shown in FIG. 15.

Such signals are supplied by an update cycle logic unit 370 (FIG. 15) which is diagrammed in FIG. 22 as a radar scan counter of a maximum count of six (0–5). Counter 370 is incremented by NORTH pulses from unit 14. Thus, after each complete radar scan or antenna revolution, counter 370 is incremented by one and is reset to 0 when the count therein is five (5) and a NORTH pulse is supplied thereto. Recalling that a radar scan is completed in 10 seconds, the counter 370 is reset to 0 once every minute which is assumed to define the interval between update cycles.

In operation, a plurality of outputs of counter 370 are utilized to define the first, second and third scans of each update cycle. Scan 1 occurs when the count in counter 370 is 0, represented by all the outputs $F_{41}$, $F_{42}$ and $F_{43}$ being false, hereafter represented by $\bar{F}_{41}$, $\bar{F}_{42}$, $\bar{F}_{43}$, while scans 2 and 3 occur when the counts in counter 370 are 1 and 2, represented by $F_{41}$, $\bar{F}_{42}$, $\bar{F}_{43}$ and $F_{41}$, $F_{42}$ and $\bar{F}_{43}$, respectively. These signal combinations are utilized in the logic stage 342 to control its mode of operation during each one of the three scans of an update cycle.

Figure 24:
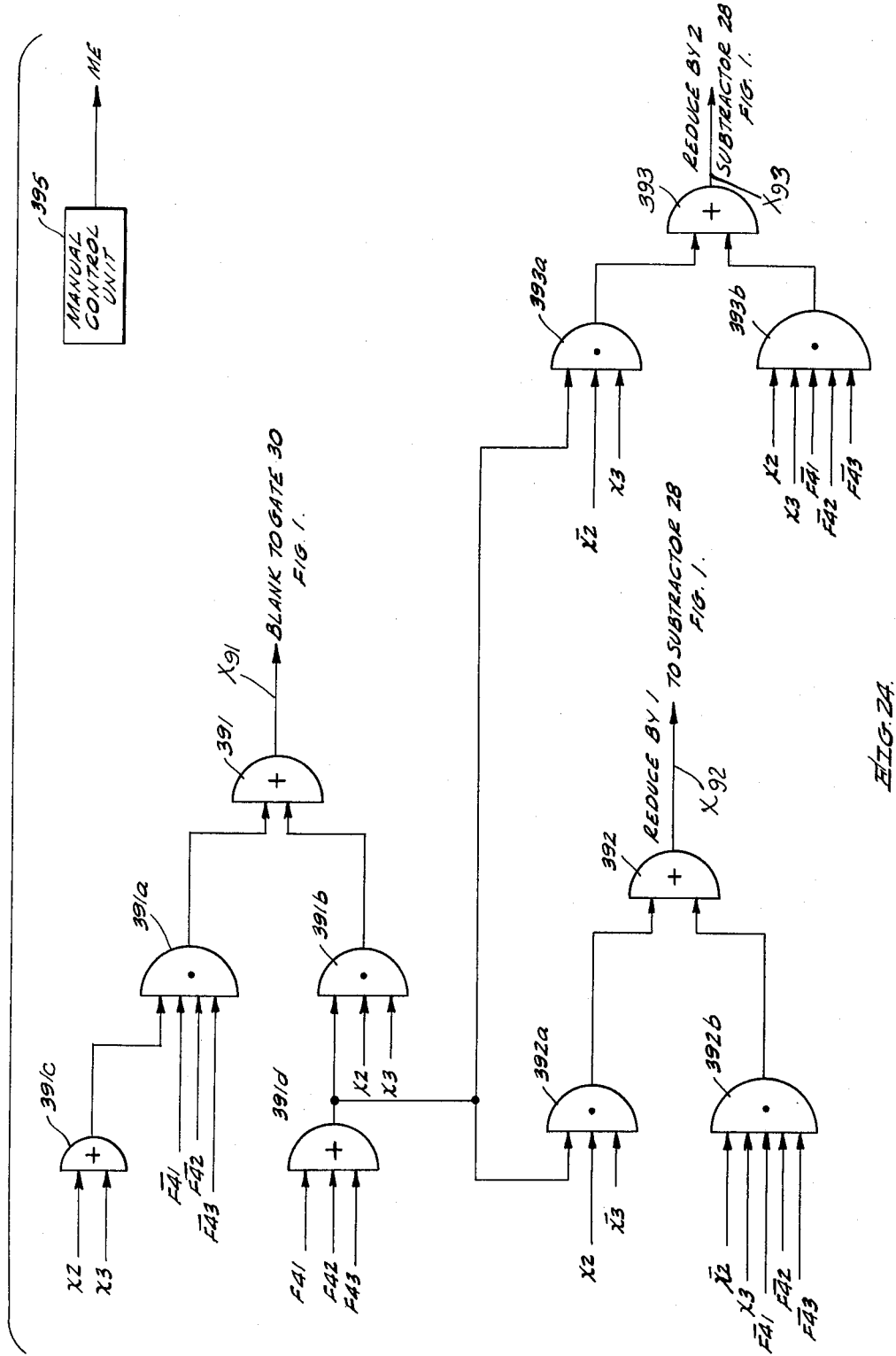

Reference is now made to FIGS. 23 and 24 which are block diagrams of gates in the logic stage 342, used to control the subtractor 28 and gate 30 in accordance with the teachings previously disclosed. In FIG. 23 three groups of gates are diagrammed, each of which includes one 6-input OR gate, 382, 383, and 384 and six 2-input AND gates. The outputs of OR gates 382 through 384 are designated as $X_2$ through $X_4$ respectively. The inputs to the various AND gates are enabled by the terms provided by sources as shown. All the input designations with an R indicate bits of read register 363. It is assumed that bits $F_{1R}$ through $F_{5R}$, $F_{6R}$ through $F_{10R}$, $F_{11R}$ through $F_{15R}$, $F_{16R}$ through $F_{20R}$, $F_{21R}$ through $F_{25R}$, and $F_{26R}$ through $F_{30R}$, contain 5-bit codes from sectors 1 through 6 respectively, with the smallest bit number in each group (such as $F_{1R}$, $F_{6R}$, etc.) storing the least significant digit (LSD). The inputs $F_{51}$–$F_{56}$ represent the outputs of flip flop 354, 356, 358, 365 366, and 367 respectively, previously described in conjunction with FIG. 20. At any given time, only one flip flop has a true output, the particular flip flop depending on the sector in which the antenna is located. It should thus be appreciated that even though as each word is read out from memory, six 5-bit codes are supplied to the AND gates in FIG. 23, the outputs of OR gates 382 through 384 represent only one of the six codes.

The selected code in the form of outputs $X_2$ through $X_4$ ($X_2$ being LSD) are supplied together with the scan-defining signals $F_{41}$, $F_{42}$ and $F_{43}$ from counter 370 (FIG. 22) to a plurality of gates shown in FIG. 24. Therein the bar (-) above any input designation indicates a complementary signal. The gates in FIG. 24 include three OR gates 391, 392 and 393. When the output of gate 391, which is connected to gate 30 (FIG. 1) is true, it closes gate 30 to inhibit the supply of target reports to utilization device 29. Similarly, the outputs of gates 392 and 393 are supplied to subtractor 28. The latter subtracts 1 or 2 from the coded video from verifier 25 (FIG. 1) when the output of 392 or 393, respectively, is true. The inputs to gate 391 are supplied through AND gates 391a and 391b and OR gates 391c and 391d, while the inputs to gates 392 and 393 are respectively supplied through AND gates 392a and 392b and 393a and 393b.

The operation of the logic circuits shown in FIGS. 23 and 24 may be summarized by the following logic equations expressed in the familiar Boolean algebra notations:

OUTPUT GATES $X_2 = F_{51}F_{2R}+F_{52}F_{7R}+F_{53}F_{12R}+F_{54}F_{17R}+F_{55}F_{22R}+F_{56}F_{27R}$
$X_3 = F_{51}F_{3R}+F_{52}F_{8R}+F_{53}F_{13R}+F_{54}F_{18R}+F_{55}F_{23R}+F_{56}F_{28R}$
$X_4 = F_{51}F_{4R}+F_{52}F_{9R}+F_{53}F_{14R}+F_{54}F_{19R}+F_{55}F_{24R}+F_{56}F_{29R}$

Blank Output
$X_{91} = \bar{F}_{41}\bar{F}_{42}\bar{F}_{43}(X_2+X_3)+X_2X_3(F_{41}+F_{42}+F_{43})$.
Reduce by 1 (3db)

$X_{92} = \bar{F}_{41}\bar{F}_{42}\bar{F}_{43}(\bar{X}_2X_3)+X_2\bar{X}_3(F_{41}+F_{42}+F_{43})$.

Reduce by 2 (6db)

$X_{93} = F_{41}F_{42}F_{43}(\bar{X}_2X_3)+X_2X_3(\bar{F}_{41}+\bar{F}_{42}+\bar{F}_{43})$. In the foregoing expressions, $X_{91}$, $X_{92}$ and $X_{93}$ represent the outputs of gates 391, 392 and 393, respectively.

The gates in FIGS. 23 and 24 only perform the logic functions necessary to provide the control signals for subtractor 28 or gate 30 of FIG. 1. The logic stage 342 includes additional gates whose function is to control the code which is rewritten into memory 340 as a function of the code read out and the presence of a target report during a particular one of the scans of each update cycle. This aspect of the invention has been previously described in conjunction with FIGS. 17, 18 and 19.

The logic functions which are to be performed for each 5-bit code which is read out are based on the relationships herebefore explained. The following equations are derived from the requirements of FIGS. 17, 18 and 19 and are mechanized in the logic stage 342 of FIG. 15. An exemplary list of logic functions for the code of sector 1 follows:

Set $F_{45} = 4°$ pulse

Reset $F_{45} = $ Dead Time $(F_{63}\bar{F}_{62}\bar{F}_{61}F_{60})$

Set $F_{1W} = \bar{F}_{51}F_{1R}+F_{51}\{\bar{F}_{41}\bar{F}_{42}\bar{F}_{43}[F_{1R}+D(F_{2R}+F_{3R})]\}\bar{F}_{5R}$ $+\bar{F}_{5R}F_{51}[F_{41}\bar{F}_{42}\bar{F}_{43}F_{1R}]+F_{51}[\bar{F}_{41}F_{42}\bar{F}_{43}F_{4R}\bar{F}_{3R}\bar{F}_{2R}F_{1R}]-\bar{F}_{5R}F_{45}$ $+F_{51}F_{5R}F_{1R}F_{51}ME+F_{51}\bar{F}_{5R}[\bar{F}_{41}F_{42}\bar{F}_{43}F_{1R}]\bar{F}_{45}$ $+F_{51}(F_{43}+F_{42}F_{41})F_{1R}$ Reset $F_{1W} = \overline{\text{Set }F_{1W}}$ Set $F_{2W} = \bar{F}_{51}F_{2R}+F_{51}\bar{F}_{5R}[\bar{F}_{41}\bar{F}_{42}\bar{F}_{43}F_{2R}]$ $+F_{51}\bar{F}_{5R}[F_{41}\bar{F}_{42}\bar{F}_{43}F_{2R}]$ $+F_{51}\bar{F}_{5R}F_{45}[\bar{F}_{41}F_{42}\bar{F}_{43}(F_{1R}F_{2R}\bar{F}_{4R}+F_{1R}\bar{F}_{2R}\bar{F}_{3R}F_{4R}+F_{3R}F_{4R}$ $+\bar{F}_{1R}\bar{F}_{2R}\bar{F}_{3R}\bar{F}_{4R})]+F_{51}F_{5R}F_{2R}+F_{51}ME$ $+F_{51}\bar{F}_{5R}\bar{F}_{45}\bar{F}_{41}F_{42}\bar{F}_{43}F_{2R}+F_{51}F_{2R}(F_{43}+F_{42}F_{41})$ Reset $F_{2W} = \overline{\text{Set }F_{2W}}$ Set $F_{3W} = \bar{F}_{51}F_{3R}+F_{51}\bar{F}_{5R}[\bar{F}_{41}\bar{F}_{42}\bar{F}_{43}\bar{F}_{44}F_{3R}]$ $+F_{51}\bar{F}_{5R}[F_{41}\bar{F}_{42}\bar{F}_{43}\bar{F}_{44}F_{3R}]$ $+F_{51}\bar{F}_{5R}[\bar{F}_{41}F_{42}\bar{F}_{43}\bar{F}_{44}(F_{3R}F_{4R}+F_{2R}F_{3R}\bar{F}_{4R}+F_{2R}F_{4R}$ $+F_{1R}F_{3R})]+F_{51}F_{5R}F_{3R}+F_{51}ME$ $+F_{51}\bar{F}_{5R}\bar{F}_{45}F_{41}F_{42}\bar{F}_{43}F_{3R}+F_{51}F_{3R}(F_{43}F_{42}F_{41})$ Set $F_{4W}$ $F_{5R}F_{51}[F_{41}\bar{F}_{42}\bar{F}_{43}\bar{F}_{44}(F_{4R}+D)]+F_{51}ME+F_{51}F_{5R}F_{4R}$ Reset $F_{4W} = \overline{\text{Set }F_{4W}}$ Set $F_{5W} = F_{5R}F_{51}+F_{51}ME$ Reset $F_{5W} = \overline{\text{Set }F_{5W}}+F_{51}ME$ In the foregoing equations, $F_{1W}$–$F_{5W}$ represents the first bits of write register 364 (FIG. 21) into which the codes for sector 1 are written during each scan of the update cycle. Also, in the equations, the letter D represents detection, i.e., a target report from correlator 26, and $F_{45}$ represents a true output from a flip flop 345, shown in FIG. 20. Flip flop 345 is set each time the count in counter 355 is incremented and is reset by flip flops F60 through F63 of elevation counter 353 at the top sweep of the first elevation scan.

It should be apparent to those familiar with the art of logic design that the foregoing equations express the logic necessary to implement the updating of the codes for incremental volumes in sector 1 (0°–59°) in accordance with the teachings previously described in conjunction with FIGS. 16, 17, 18 and 19. The logic is actually implemented by gates interconnected to perform the desired relationship. Such techniques are well known in the art and therefore the description of the various gates is not included herein. By way of example, considering the equation beginning on line 1 on page 65, the flip flop F1W (FIG. 21) is set during recirculation ($\bar{F}_{51} F_{1R}$) or the no action condition of line 5 of FIG. 17 ($F_{1R}$) or a detected target D and the conditions of lines 2 or 3 of FIG. 17 ($F_{2R} + F_{3R}$) when there is no manual entry ($\bar{F}_{5R}$). Relative to line 3, $F_{1W}$ is set when the signal read from the memory is false ($\bar{F}_{5R}$) and when the scan count is 100 ($F_{41} \bar{F}_{42} \bar{F}_{43}$) and a one was read from the memory ($F_{1R}$) which are the conditions of lines 3, 5, 7 and 8 of FIG. 18. Also $F_{1W}$ is set in the third scan if the conditions of line 2 of FIG. 19 are met ($\bar{F}_{41} F_{42} \bar{F}_{43} F_{4R} \bar{F}_{3R} \bar{F}_{2R} F_{1R}$). In line 5 of page 65, the flip flop $F_{1W}$ is set if the manual entry (ME) condition is met or if a one is read from the memory and it is not the first elevation scan in that azimuth as the system may operate with more than one elevation scan in one 4° azimuth sector. Relative to line 7, of page 65, flip flop $F_{1W}$ is set if it is not an update cycle ($F_{43} F_{42} F_{41}$) $F_{1R}$. The equation on line 9 of page 65 shows that flip flop $F_{1W}$ is reset if a set signal is not generated.

ME in the equations indicates a true output from a manual control unit designated by numeral 395 in FIG. 24. Its function is to override the automatic code updating cycle and rewrite into memory 340 a code which is manually, rather than automatically, determined. Techniques to produce a manual entry are well known in the art, and therefore manual control unit 395 is diagrammed in FIG. 24 in simplified block form.

Heretofore, the system has been described in conjunction with circuitry which controls the target detection criteria for each incremental volume of the radar surveillance as a function of a 5-bit code representing the target detection history of the volume. The code is updated during each of a sequence of update cycles. The code is used to modify the coded video received from each range bin of the incremental volume by subtracting 1 or 2 from the coded video and thereby decrease the detection sensitivity or increase or tighten the detection criteria.

In another embodiment of the invention, the detection criteria is controlled as a function of the rate at which target reports are produced by correlator 26, as well as a function of the rate at which coded video above a certain level are provided by quantizer 24 and video verifier 25. This aspect of the invention may best be described in conjunction with FIG. 25. Therein, video quantizer 24, video verifier 25, video correlator 26 and subtractor 28 are again shown in block form. The circuitry required to determine the rate of target reports includes a miss counter 401 and a target rate counter 402. The output of video correlator 26, which is assumed to be at "1" state when a target report is produced, is supplied to counter 402 and to one input of an AND gate 404 through an inverter 406. The other input of AND gate 404 responds to a range bin pulse, and the output of AND gate 404 is connected to the input of miss counter 401.

Basically, in the absence of a target report from correlator 26, i.e., when a miss is provided thereby, counter 401 is incremented by one for each range bin pulse. Counter 410 is connected to be reset at the count of 1,000 at which time it supplies a pulse to counter 402, decrementing the count therein. However, when a target report is produced, counter 402 is incremented by a count which depends on the number of meaningful targets which are to be expected in each radar scan of 360°. For example, if the expected number of targets is 180, five targets are expected in each 10° sector. And since in a 10° sector, there are 10×10×400=40,000 range bins, the count in counter 102 is increased by eight for each target report. Thus, during each 10° sector for the five targets, the count in counter 402 should increase to 40. But the misses in the sector counted by counter 401 would reduce the count to about zero since counter 401 would overflow about 40 times during the scanning of the 10° sector. Consequently, if the rate at which targets are received is as expected, i.e., five targets per 10° sector, the count in counter 402 would be about zero. If, however, the target rate is double the expected rate, 10 targets are received per 10° sector so that the count in counter 402 increases to 40. Thus, the counter in counter 402 is indicative of target rate. The count may be used to directly control subtractor 28 so that when the count exceeds a given value, the coded video from quantizer 24 is modified, by subtracting 1 from each 3-bit hit code.

In a preferred embodiment, however, the count in counter 402 is supplied to a target rate logic circuit 405 whose output, when true or in a "1" state, causes subtractor 28 to subtract 1 from each 3-bit hit code. Circuit 405 is provided with a second input which represents the rate at which coded video above a certain value or level are supplied by quantizer 24 to subtractor 28.

Recalling from FIG. 3 that coded video from quantizer 24 may be any one of eight 3-bit codes, circuitry is included in the arrangement shown in FIG. 25 to determine the rate at which coded video of a code 3 hit (011) or greater are supplied by verifier 25. When this rate exceeds a given value, a true signal is supplied to logic circuit 405 for use therein together with the count from target rate counter 402 to determine whether a 1 should be subtracted from the coded video supplied to correlator 26.

The circuitry includes a digital compare circuit 407 which provides a true output whenever the coded video from quantizer 24 is a code 3 hit (011) or greater (see FIG. 3). Its output is clocked into a shift register 409 whose five bits are designated B1 through B5. The output of B3 is supplied to an incrementing input of a counter 410 and through a decrementing input of counter 410 through an inverter 412. The count in counter 410 is incremented whenever B3 stores a true signal representing a true output from circuit 407 which in turn represents a code 3 hit or greater from quantizer 24.

Shift register 409 and four logic gates, including AND gates 413, 414 and 415 and OR gate 416 are used to inhibit the incrementing of counter 410 when three successive coded video are code 3 hits or greater. Gates 413, 414 and 415 are supplied with the output of bits B1, B2 and B3; B2, B3 and B4; and B3, B4 and B5, respectively. The reason that counter 410 is inhibited from counting is that such three successive coded video from three successive range bins are more likely due to a large body of clutter rather than a meaningful target.

From the foregoing, it should thus be appreciated that the count in the counter 410 represents the rate at which large coded video is supplied by quantizer 24 while the count in counter 402 represents the rate at which target rates are produced by correlator 26. The counts in the two counters are supplied to the logic circuit which produces an output, causing subtractor 28 to subtract a 1 from the coded video supplied to correlator 26 only when the counts in the two counters are of known relationships. For example, in one embodiment, logic circuit was operated to cause subtractor 28 to subtract a 1 when the count in counter 410 indicated a high rate of twice the expected rate. Also a 1 was subtracted when the rate of coded video was normal but the rate of target report was three times the expected rate such as, for example, 540 target reports per 360° scan.

BEAMSPLITTER 31

The buffer and beamsplitter 31 as set forth in FIG. 1 is a system for automatically detecting the targets as well as interrelating adjacent target detections to provide accurate target azimuth and elevation positions. The latter aspect of the system of beamsplitter 31 may be thought of as means for automatically beamsplitting the azimuth and elevation signals produced by the detection of a relatively large target in order to more precisely locate the target's azimuth and elevation. Such a system suitable for buffer and beamsplitter 31 is described in copending application S.N. 665,383, filed Sept. 5, 1967.

Thus there has been shown and described in accordance with preferred embodiments of this invention, an automatic data processor which is useful in radar systems. The system defines a multi-level detection system which converted real time analog data in the form of radar return signals to digital data word having a weighted value which is indicative of the analog data. Only data word of a known and predetermined value are passed by the quantizer. Those data words which fail to meet this predetermined value are rejected. A means has been provided which verifies the digital data word and which includes a counting means on each digital video input for distinguishing clutter from actual target returns. A means is provided which correlates the data words and provides moving window detection at known false alarm rates for providing a pattern recognition which determines actual targets from false alarms. A detector criteria control means is provided to map all target reports and further distinguish target in an off-line manner for blanking clutter to a utilization device and for modifying the criteria of the predetermined value of the data word to change its sensitivity and rejection level; thus clutter and interference are removed without blanking in certain cells. A means is provided for precisely calculating the target position within a fraction of the beamwidth volume and which relies upon data provided by the criteria control means.

Having thus described preferred embodiments of this invention, what is claimed is:

1. A data processor for processing radar data from a pair of receivers having differing bandwidths, said processor comprising:
   a first quantizer having an input channel coupled to one of said receivers and an output channel, the output channel providing quantized data words indicative of data provided to the input channel;
   a second quantizer having an input channel coupled to said other receiver and having an output channel, the output channel providing quantized data words indicative of the data provided to the input channel thereof;

a data verifier for verifying that the data words from said first and second quantizers are within a preselected relationship to each other; said data verifier having a pair of input channels coupled to the output channels of said quantizers, a signal output channel and a control output channel;

a correlator having an input channel coupled to the signal output channel of said data verifier and having an output channel, said correlator including means for recognizing predetermined patterns of data words provided by the output channel of said verifier and for providing an output indicative of the predetermined data word recognized; and means coupled to said control output channel of said verifier and to the output channel of said correlator for inhibiting the output of said correlator if the data words from said first and second quantizers are not within said predetermined relationship.

2. The radar data processor of claim 1 further comprising an off-line detector having a first data channel coupled to said correlator and a second data channel coupled to the output signal channel of said data verifier, and including means for modifying the data words from the output channel of said data verifier as a function of the number and magnitude of signals received from each associated incremental volume of space.

3. In an automatic multi-level radar detection system having a source of return signals from a plurality of range bins in a surveillance volume in azimuth and elevation dimensions, said source including a pair of receivers having differing bandwidths; a radar data processor comprising:

a first quantizer having an input channel coupled to one of said receivers and an output channel, the output channel providing digitized data words indicative of the input to said first quantizer;

a second quantizer having an input channel coupled to said other receiver and having an output channel, the output channel providing digitized data words indicative of the input to said second quantizer;

a data verifier for verifying that the data words from said first and second quantizers are within a preselected relationship to each other, said data verifier having a pair of input channels coupled to the output channel of said quantizers, a signal output channel and a control output channel;

a correlator having an input channel coupled to the output channel of said data verifier and having an output channel, said correlator including means for recognizing predetermined patterns of data words provided by the output channel of said verifier and for providing an output indicative of the predetermined data word recognized; and means coupled to said control output channel of said verifier and to the output channel of said correlator for inhibiting the output of said correlator if the data words from said first and second quantizers are not within said predetermined relationship.

4. The radar data processor of claim 3 further comprising an off-line detector having a first data channel coupled to said correlator and a second data channel coupled to the output signal channel of said data verifier and including means for modifying the data words from the output channel of said data verifier as a function of the number and magnitude of signals received from an associated incremental surveillance volume.

5. In the automatic multi-level detection system as defined in claim 4 wherein said off-line detector comprising:

a means for storing a target-detection-history indicating code for each multi-range bin incremental volume of the surveillance radar;

a means for using each code to control the quantized video returns from the range bins of the incremental volume associated with the code; and a means for updating during each of a sequence of update cycles the code of each incremental volume as a function of the code characteristics and a target report from said correlating means provided during the update cycle for any of the range bins in the incremental volume.

6. In the automatic multi-level detection system as defined in claim 5 wherein the code at the beginning of an update cycle is indicative of the history of detection of the targets in any of the range bins of an incremental volume associated with the code during preceding update cycles in said sequence, and wherein the quantized video returns from each range bin are represented by a multi-bit number whose numerical value is indicative of the peak of the video returns with respect to a preselected threshold level, said utilizing means subtracting a first numerical quantity from the quantized video returns of all range bins in an incremental volume when the code represents target detection in two successive update cycles and a second numerical quantity larger than said first, when the code represents target detection in three successive update cycles.

7. In the automatic multi-level detection system as defined in claim 6 and further comprising:

a means for blanking the supply of target reports from said receiving system from range bins in a given incremental volume when the code associated with said volume is indicative of target detection in a preselected number of successive update cycles.

8. In the automatic multi-level detection system as defined in claim 5 and further comprising:

a means for modifying the quantized video returns as a function of the rate of target reports from said correlator.

9. In the automatic multi-level detection system as defined in claim 5 further comprising:

a means for modifying the quantized video returns supplied to said correlator as a function of the rate at which quantized video returns above a selected value are developed.

* * * * *